(12) United States Patent
Bryant et al.

(10) Patent No.: US 8,370,211 B2
(45) Date of Patent: Feb. 5, 2013

(54) COMPUTER SYSTEM

(75) Inventors: Clive Bryant, Northampton (GB); Dylan Bartlett, Birmingham (GB); Chris Lawton, Birmingham (GB)

(73) Assignee: Gems TV Ltd., West Midlands (GB)

( * ) Notice: Subject to any disclaimer, the term of this patent is extended or adjusted under 35 U.S.C. 154(b) by 1871 days.

(21) Appl. No.: 11/465,841

(22) Filed: Aug. 21, 2006

(65) Prior Publication Data

US 2007/0156571 A1   Jul. 5, 2007

(30) Foreign Application Priority Data

Aug. 3, 2006  (GB) .................................. 0615378.7

(51) Int. Cl.
*G06Q 30/00* (2006.01)
(52) U.S. Cl. .......................... 705/26.3; 705/27.1; 705/37
(58) Field of Classification Search .................... 705/26, 705/27, 37
See application file for complete search history.

(56) References Cited

U.S. PATENT DOCUMENTS

2001/0032162 A1* 10/2001 Alsberg et al. .................. 705/37
2002/0174060 A1* 11/2002 Friedland et al. ............... 705/37
2005/0080707 A1*  4/2005 Glasspool ....................... 705/37

OTHER PUBLICATIONS

McIver, Brian: "Auction Stations As watchdogs hit out at Auctionworld for selling products 28 times higher than they should be, Brian McIver investigates the world of Britain's auction shopping channels," Daily Record, Nov. 19, 2004, Dialog file 757 #0002408475, 4pgs.*

* cited by examiner

*Primary Examiner* — Robert M. Pond
(74) *Attorney, Agent, or Firm* — Barnes & Thornburg LLP

(57) ABSTRACT

A method of conducting a telephone or internet based reverse auction for selling units where the reverse auction is transmitted to users on a medium, the method comprising the steps of providing a number of units for sale and storing a preliminary available quantity in an allocation database initially indicative of the number provided for sale, providing a telephone number or web site to which calls or orders from users can be placed to enter the reverse auction, recording the time at which one or more calls or orders were received on the telephone number or at the website in a record database, placing any callers into a queue and assigning them to a call operator or system in order to sell a unit, conducting a reverse auction in which a person or system reduces the indicated price of a unit over time and in which a producer or system reduces the preliminary available quantity, the reverse auction is concluded at the time of the preliminary available quantity is reduced to a pre-determined number, such as zero, with the price at the conclusion being stored in an auction database, wherein the preliminary available quantity is reduced based at least partly on one or more preliminary indicators associated with a call/user, such as the time of the acceptance of the call or order in the record versus the timing of the auction, which indicator(s) occur before a sale of a unit is completed/confirmed.

39 Claims, 36 Drawing Sheets

FIG. 2 /32

| DATE REF | 102 |
|---|---|
| CALLID | 104 |
| CALLING NO | 106 |
| RECEIVED | 110 |
| TIME IN | 112 |
| ANSWERED | 114 |
| CLEARED | 116 |
| PRODUCTID | 118 |
| PRICEIN | 120 |
| CHANNEL | 122 |
| EXTENSION | 124 |

FIG. 3a /40

| CUSTOMER NAME | 202 |
|---|---|
| ADDRESS | 204 |
| TEL NUMBER | 206 |
| PRODUCT CODE | 208 |
| ADDITIONAL PRODUCTS | 210 |
| PAYMENT DETAILS | 212 |
| PRICE | 214 |
| CORRESPONDING CALLID | 216 |

FIG. 3b /37

| CUSTOMER NAME | 222 |
|---|---|
| ADDRESS | 224 |
| TEL NO | 226 |
|  | 228 |
|  | 229 |
| REFERENCE NUMBER | 227 |

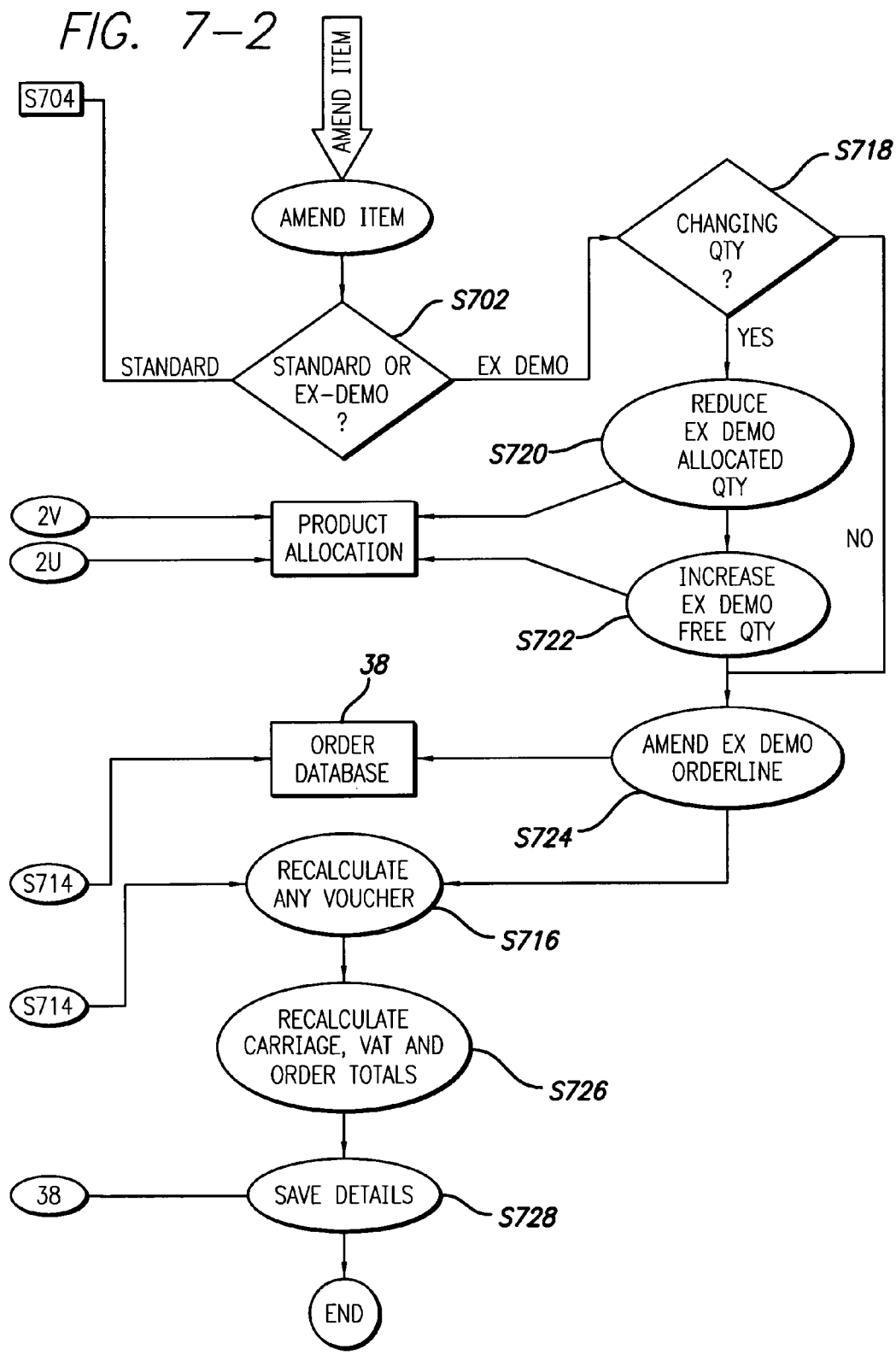

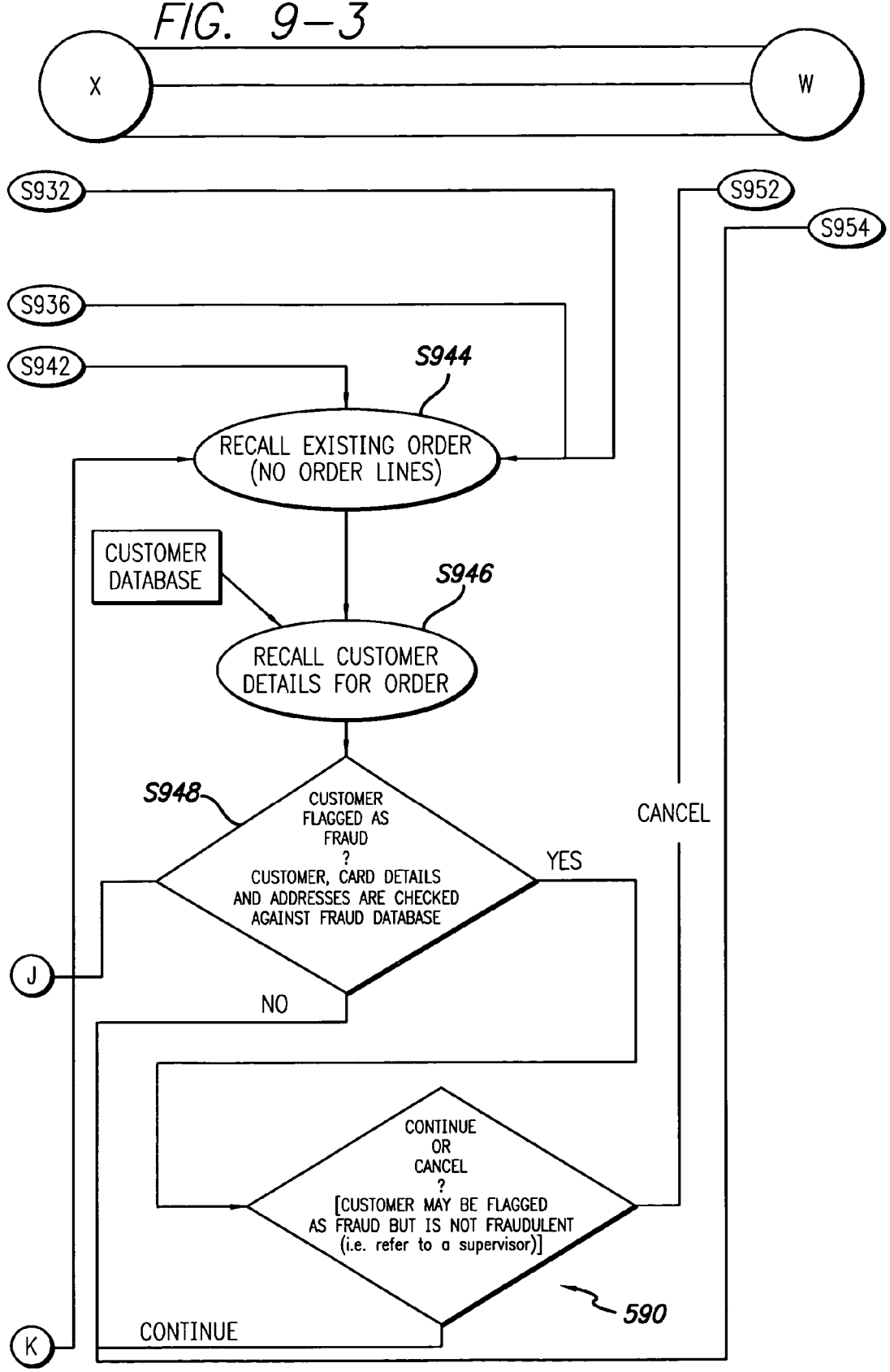

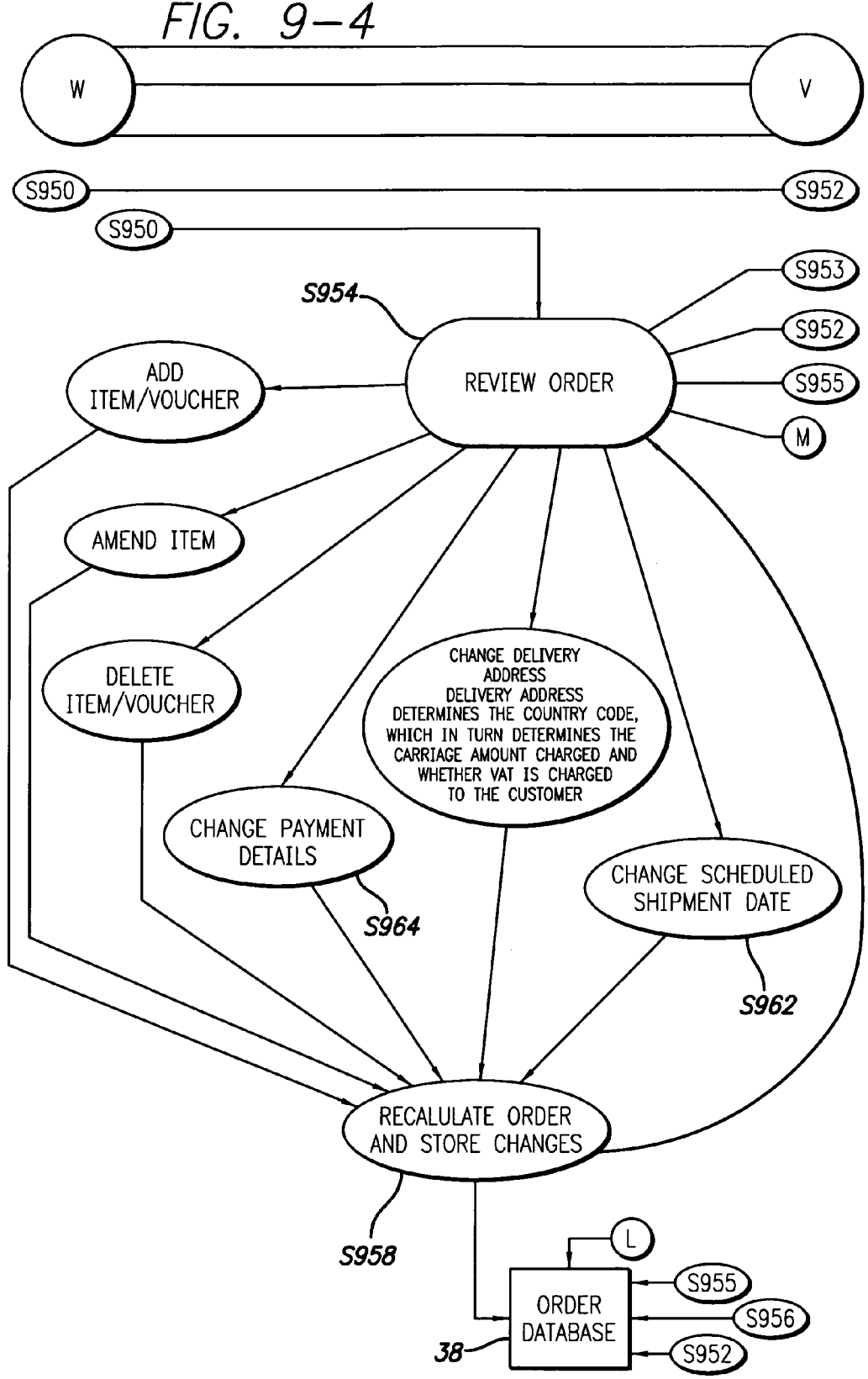

| 12-1 | 12-2 | 12-3 | 12-4 | 12-5 |

FIG. 12

COMPUTER SYSTEM

CROSS-REFERENCE TO RELATED PATENT APPLICATIONS

This patent application claims priority to United Kingdom patent application no. GB 0615378.7, filed Aug. 3, 2006, the content of which is herein incorporated by reference in its entirety.

FIELD

This disclosure relates to systems and methods for conducting auctions and in particular reverse auctions by telephone and/or television and Internet.

BACKGROUND & SUMMARY

It is known to attempt to sell goods using television or other media. This is typically done by showing a product on television with an accompanying price. The goods seller will then allow anyone to call in by telephone and to make a purchase of the product which is displayed on television. Such systems can either allow the user to telephone in at any time, or may only allow them to call in and order whilst it is on screen. The former system has a disadvantage that there is no time incentive for a person to ring and they can easily watch through several products being sold before deciding whether to buy. The second system helps give an incentive for someone to telephone in immediately to buy a product, but it suffers the disadvantage that only a certain number of calls can be processed during the time in which the product is on screen and therefore both television broadcasts spectrum capacity and telephone network capacity must be simultaneously consumed for the entire time for which it is desired to sell a single product. This is technically inefficient.

It is also known in the UK to attempt to conduct auctions having non-fixed prices on television. This brings an advantage of a timing incentive when people ring. However, these suffer the disadvantage that a user going through the order, buying and registration process takes considerable time to do so and therefore consumes telephone network capacity. Since it is necessary for the entire auction process to be televised, the slowness of completing each sale slows the auction and hence consumes a large amount of television network capacity. One alternative to this is to only allow pre-registered users to play therefore speeding up the timing of the auction. This alternative has the disadvantage that non-registered users cannot take part in the auction.

Another type of auction is a reverse auction. Implementing this onto television screens will be problematic because the auction ends only after all units have been purchased. The final price is set when the final unit sells, sometimes being the same for all winning participants. This is problematic since it cannot be determined whether a unit has been allocated until after someone goes through the registration and buying procedure. Accordingly it takes a significant length of time when using a medium such as television which leads to inefficient usage of capacity.

Even when sales on television go onto the next unit before all the ordering is finished they cannot use the same telephone number as for the previous product. This is because the telephone number is used to distinguish between products and therefore those ringing a certain telephone number will be assumed to be buying a certain product. Changing the product that corresponds to the telephone number midway through ordering can cause confusion as to which product the user is attempting to buy.

It is also problematic to keep control of the numbers of units being sold versus the amount in stock. It is relatively easy with known auction systems to oversell products. It is also quite possible to undersell products. In these circumstances products are inefficiently left unsold within the desired television and telephone network capacity usage, even though there may be other people attempting to take part in the auction who might be interested in buying them. In order to get round this problem it is necessary to keep a continuous monitor on each call so that if a call eventually leads to a sale, it can be known that that caller should not be targeted for reselling unsold products. This is technically inefficient and expensive as each call must be monitored throughout its time and all details for each call stored in a single database entry.

It is also known to sell products over the Internet but such users do not get the interactive descriptions of products that accompany television selling.

It is an object of the present disclosure to mitigate some of the problems mentioned above. It is also an object by technical solutions to some of the technical problems mentioned above to enable a more efficient system to be used.

According to the first aspect of the disclosure there is provided a method of conducting a telephone based reverse auction for selling units where the reverse auction is transmitted to users on a medium, the method comprising the steps of providing a number of units for sale and storing a preliminary available quantity in an allocation database initially indicative of the number provided for sale, providing a telephone number to which calls from callers can be placed to enter the reverse auction, recording the time at which one or more calls were received on the telephone number in a call record in a call database, placing each caller into a queue and assigning them to a call operator or system in order to sell a unit, conducting a reverse auction in which a person or system reduces the indicated price of a unit over time and in which a producer or system reduces the preliminary available quantity, the reverse auction is concluded at the time of the preliminary available quantity is reduced to a pre-determined number, such as zero, with the price at the conclusion being stored in an auction database, wherein the preliminary available quantity is reduced based at least partly on one or more preliminary indicators associated with a call/caller, such as the time of the acceptance of the call in the call record versus the timing of the auction, which indicator(s) occur before a sale of a unit is completed/confirmed.

According to a second aspect of the disclosure there is provided a computer system for conducting a reverse auction of units, the system comprising a processor, a memory including an allocation database, an auction database, and a call database, a telephony system, a display, the allocation database containing a preliminary available quantity indicative of the number of units provided in an auction, the telephony system being configured to record the time at which a call is received and the number which was dialled in a call record in the call database, and configured to place each caller into a queue assigning them to a call operator or system in order to sell a unit, the processor configured to display a price on the display and to reduce the displayed price over time and to reduce the preliminary available quantity, and to determine when the preliminary available quantity is reduced to a pre-determined number, such as zero, to store the displayed price at that time in the auction database, and to prevent new telephone call to the telephony system being entered into the auction wherein the system reduces the preliminary available quantity based at least partly on one or more preliminary indicators associated with a call/caller, such as the time of the acceptance of the call in the call record versus the timing of the auction, which indicators occur before a sale of a unit is finalised.

According to a third aspect of the disclosure there is provided a method of selling units on television by reverse auction comprising the steps of displaying a unit for sale on television along with an initial price and the number of the units available for sale in the auction, allowing telephone calls to be made to take part in the auction, the displayed available quantity being reduced when it is believed a caller has given sufficient indications that a sale is likely or has occurred, reducing the displayed price for the unit to encourage more callers to reduce the television time taken up by the auction and concluding the auction when the displayed available quantity reaches zero.

According to a fourth aspect of the disclosure there is provided a method of conducting an internet based reverse auction for selling units where the reverse auction is transmitted to users on a medium, the method comprising the steps of providing a number of units for sale and storing a preliminary available quantity in an allocation database initially indicative of the number provided for sale, providing a website purchasing facility to which orders from users can be placed to enter the reverse auction, recording the time at which one or more orders were received on the telephone number in a call record in a call database, placing each caller into a queue and assigning them to a call operator or system in order to sell a unit, conducting a reverse auction in which a person or system reduces the indicated price of a unit over time and in which a producer or system reduces the preliminary available quantity, the reverse auction is concluded at the time of the preliminary available quantity is reduced to a pre-determined number, such as zero, with the price at the conclusion being stored in an auction database, wherein the preliminary available quantity is reduced based at least partly on one or more preliminary indicators associated with a call/caller, such as the time of the acceptance of the order in the call record versus the timing of the auction, which indicator(s) may occur before a sale of a unit is completed/confirmed.

In one embodiment, the order in which calls are put through to the call operator or system is dependent on the stored time on the call record and/or wherein the price at which a unit is sold is determined from the price at the conclusion stored in the auction database.

In one embodiment, the method may comprise the step of prompting each caller to enter a piece of data, optionally before entering them into the queue, and storing that data on the call record. The call may be placed into the queue is dependent on the data entered and/or one preliminary indicator comprises the data entered and is stored in the call record and/or one preliminary indicator comprises the time that the data is entered and stored in the call record.

In one embodiment, the prompting step prompts the user to enter a number on their telephone and where one or more numbers may be taken as a preliminary indicator and zero, one or more numbers are taken to not be a preliminary indicator.

In one embodiment, the number of units provided and a final allocation is also stored in the allocation database, the final allocation is increased whenever a final sale is completed, the system determining whether a sale can be made by determining if the allocation is still below the numbers of units provided. In another embodiment, the method comprises the step of checking that a preliminary indicator corresponding to that call has already resulted in a reduction of the preliminary availability and if not reducing the preliminary available quantity, whenever the final allocation is increased in response to the allocation increase and/or the step of generating an order record whenever a sale is confirmed, the order record including payment details.

In one embodiment, both registered and unregistered callers may take part in the auction.

In one embodiment, the method includes the step of determining the telephone number from which a call has been made and comparing this to a customer database of registered users, where the comparison provides a match allocating the stored customer details to the caller and/or the step of storing events such as preliminary indicators, initial and final price and/or number sold in a game database. In another embodiment, if there is no match the call operator or system selling the unit to the caller takes details of the caller and enters them along with their telephone number into the customer database for future use and/or events associated with an individual caller are stored in the game database linked to that caller such as in the call database or the customer database, and wherein previously stored data may be recalled when a caller is identified and/or one preliminary indicator comprises a comparison of one or more events in the auction with historical events in the game database and/or wherein one preliminary indicator comprises an identified callers stored events in the game database such as where a caller is found to have high/frequent historical spending patterns.

In one embodiment, in the event of there being more callers giving preliminary indicators than available units, the callers with the earlier times on their call record are sold the units or the callers who gave appropriate preliminary indicators are sold the units and when there are more callers who gave the appropriate preliminary indicator than there are available units, the callers who gave the appropriate indicator and have the earlier stored time are sold the units.

In one embodiment, where the product that was part of the auction at the time the caller called is also stored in the call database and when put through to the operator or system the unit offered for sale to them is determined from the stored product in the call record. In another embodiment, the auction is used to sell a different product and the different product is stored in the call database for a new caller after the preliminary available quantity has dropped to the predetermined number, in one embodiment, before the completion of all sales or before any increase in the final allocation, and the same telephone number may be provided for calls from callers, including the new caller, to be placed to enter the reverse auction for the different product as was provided for the first product.

In one embodiment, one of the numbers constitutes confirmation of an intent to buy the product in the auction. In another embodiment, the preliminary available quantity will not be reduced unless the correct number of the keypad has been pressed by a caller or the caller subsequently went on to place an order.

In one embodiment, orders can be placed by internet as well as by telephone. In another embodiment, the auction is transmitted over the internet and also maybe be transmitted by another medium such as television and/or the act of a user notifying intent to buy an auction unit on the internet such as by placing it in a shopping cart may comprise a preliminary indicator and/or may result in the final allocation being increased.

In one embodiment, one or more callers who were unsuccessful in the auction are called back after the auction using their determined telephone number to make a further sale or to have details taken. In another embodiment, callers are called back or not called back based on one or more preliminary indicator corresponding to their call during the auction and/or one or more callers who were unsuccessful in the auction are identified by matching call records to order records and removing those that match, from a list to be called back and//or the order records are matched to call records by generating a unique number for each call and storing this in both records.

In one embodiment, the order records are matched to call records by matching the order record to data in the customer database and using the stored telephone number in the customer database corresponding to that data to match the data with a call record in which that telephone number was recorded, and then tagging that call record to the order record.

In one embodiment, the steps of a person or a system requesting a reduction in the preliminary available quantity and determining whether the request reduction can be made by comparing the requested reduction with a maximum possible sold quantity and not allowing a reduction in number which would reduce the available preliminary quantity to a number below the starting value less the maximum possible sold quantity. In one embodiment, the reduction requested would reduce the preliminary quantity to below the maximum possible sold quantity, the quantity is instead reduced to the starting value less the maximum possible sold quantity and/or the maximum value is calculated by adding together the total number of calls received with any website orders and/or any additional units bought by a caller who has gone through the sales process In one embodiment, the price is frozen once the displayed available quantity has reached zero and all the units in the auction are sold at the frozen price and/or comprising the step providing information concerning the auction on a website substantially simultaneously as on television and allow entries into the auction to be made from the internet.

Embodiments of the disclosure will now be described, by way of example only, with reference to the accompanying drawings.

BRIEF DESCRIPTION OF THE DRAWINGS

FIG. 3a is an overview of the categories of an order record kept in accordance with the disclosure;

FIG. 3b is an overview of the categories of a customer record kept in accordance with the disclosure;

FIGS. 5 to 5-2 are a flow chart of a process of verifying whether the allocation on which the determination of a reverse auction is based can be reduced, FIG. 5 being a smaller scale diagram showing the whole formed by partial views 5-1 to 5-2;

FIGS. 7 to 7-2 are a flow chart of making amendments to an order, FIG. 7 being a smaller scale diagram showing the whole formed by partial views 7-1 to 7-2;

FIGS. 8 to 8-2 are a flow chart of a process of matching call records to order records in accordance with the disclosure such as the call record of FIG. 2 and the order record of FIG. 3, FIG. 8 being a smaller scale diagram showing the whole formed by partial views 8-1 to 8-2;

FIGS. 9 to 9-7 are a flow chart of checking order history, FIG. 9 being a smaller scale diagram showing the whole formed by partial views 9-1 to 5-7;

FIGS. 12 to 12-5 are a flow chart of authorising a credit card, FIG. 12 being a smaller scale diagram showing the whole formed by partial views 12-1 to 12-5.

DETAILED DESCRIPTION

Figure 1:
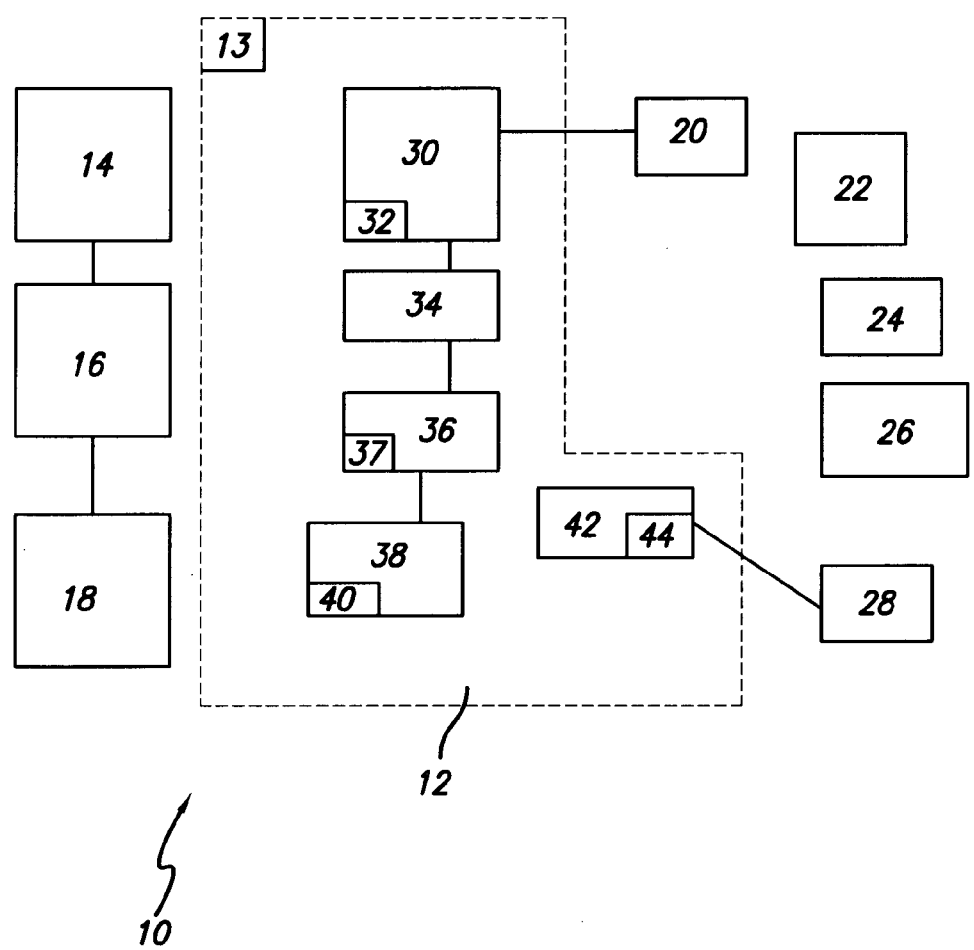
FIG. 1 is a schematic overview of the architecture of a system according to the disclosure.

Referring to FIG. 1 there is shown a system 10 comprising central computer system 12; a call receiver 14, a communication application monitor 16, call centre 18, a web site 20, a game database 22, a television producer 24, broadcast graphics components/computer 26 and a delivery system 28. Components 14 through 28 arguably could in alternative embodiment form part of the computer system 12. The call communication application 16 can monitor the call receiver 14 and call centre 18. The call receiver 14 is also in communication with the call centre 18.

The computer system 12 comprises various databases and a processor 13. It includes call database 30 in which are stored call records 32, a telephone look up system 34, a customer database 36 which includes customer records 37, an order database 38 including order records 40, and a product database 42 including product allocation 44.

The call receiver 14 is able to take calls from a switchboard, such receipt of calls being monitored by the communication monitor application 16, which calls may eventually be put through by computer system 12 to the call centre 18. The call retriever 14 is in communication with the call database 30, whilst the call centre 18 is in communication with both the call database 30 and order database 38.

The order database 38 and the product database 42 are in communication with the delivery system 28.

Figure 4:
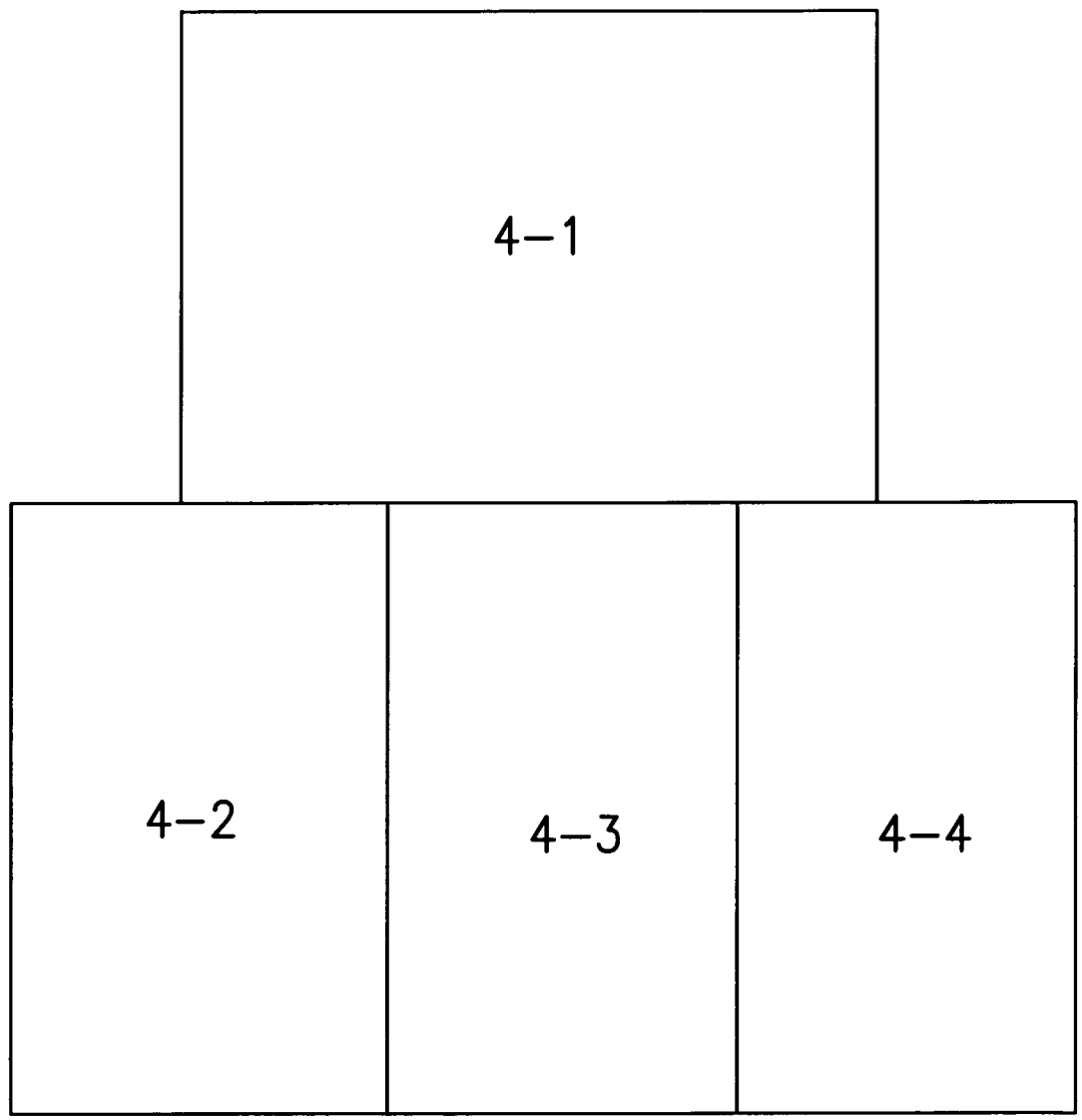
FIGS. 4 to 4-4 are a flow chart of a process of performing an auction in accordance with the disclosure, FIG. 4 being a smaller scale diagram showing the whole formed by partial views 4-1 to 4-4.
Figures 1, 4:
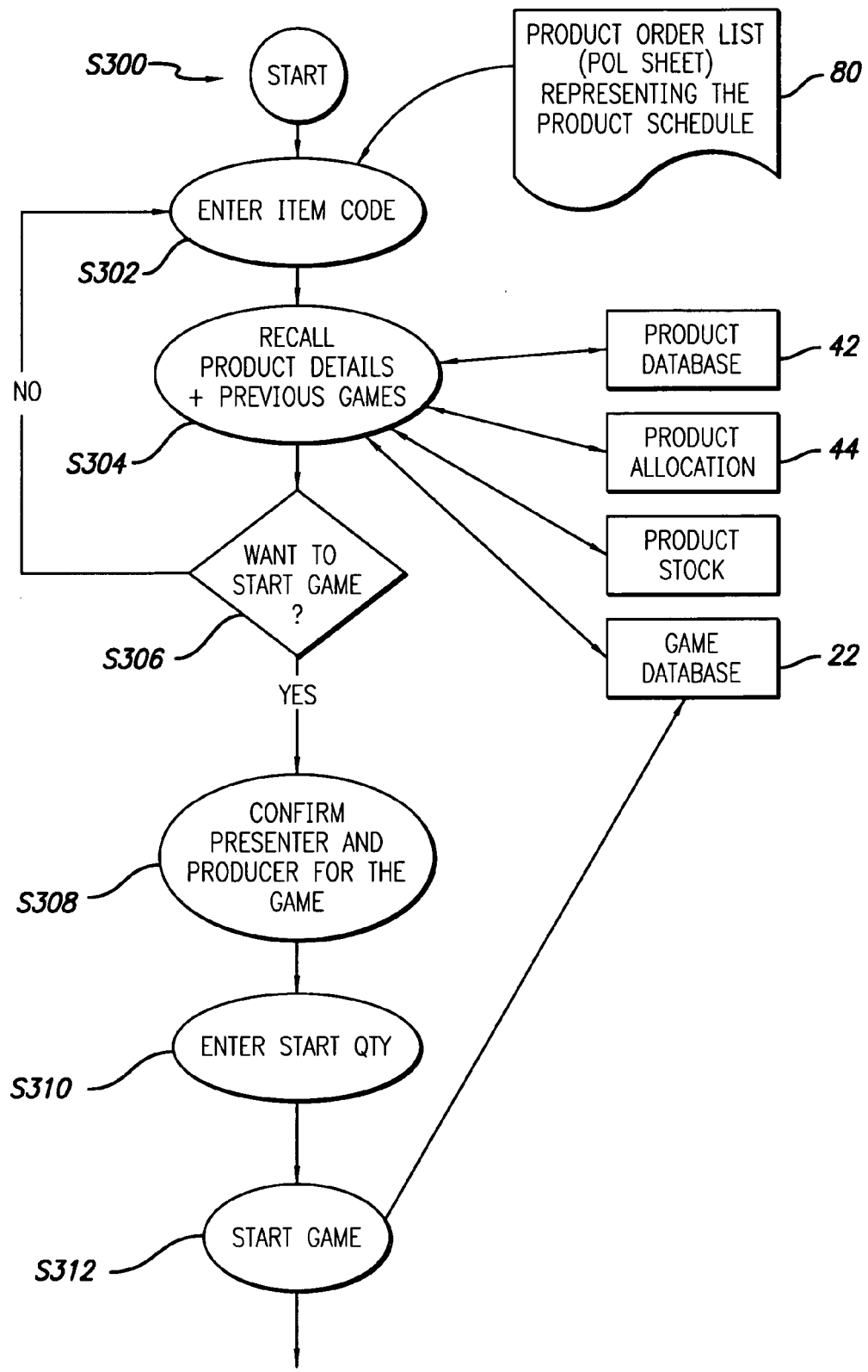
Figures 2, 4:
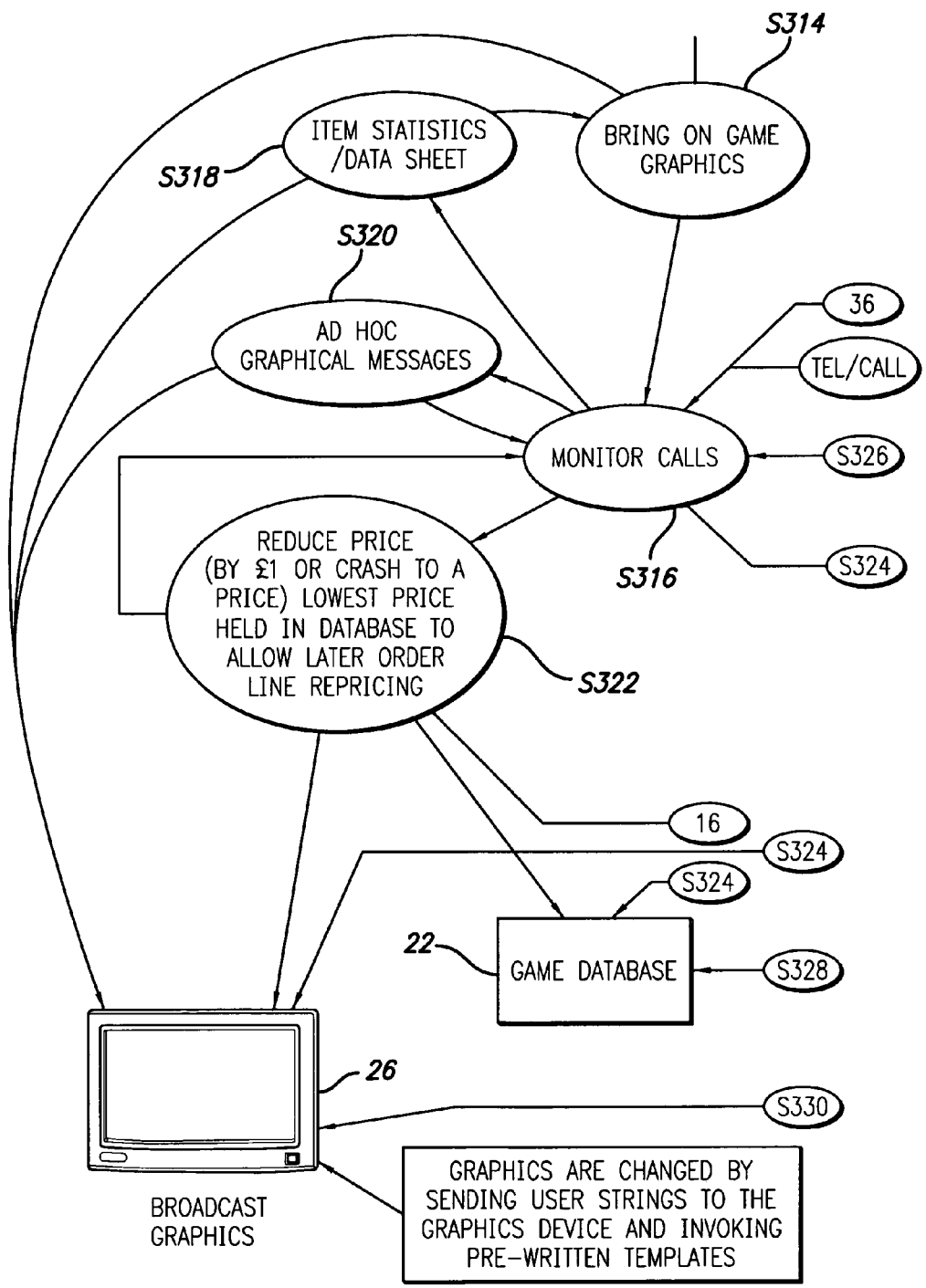
FIG. 2 is a depiction of a call record forming part of the disclosure.

In FIG. 2 is shown a call record 32 in more detail. It can be seen that the call record has a series of categories into which data can be entered. In effect these are fields in a database entry. The fields are date reference 102, call ID 104, calling number 106, received 110, TimeIn 112, answered 114, cleared 116, product ID 118, PriceIn 120, channel 122 and extension 124.

The date reference 102 includes data which relates to the time and date that the call was first received by call receiver 14. The call receiver 14 stamps each call and marks it in the newly created call record 32. The call ID 104 is an identifying number given to that particular call. This could be a unique number for each call record 32 or can be used as a unique identifier for the call record 32 when combined with the date reference 102. For example it can be provided by a rolling number generator which has a set number of digits, such as 4 digits which moves forward sequentially to the next number every time a new call record facility is created. Whilst eventually the set number of digits will roll back to zero by combining the identifying number in the caller ID 104, together with date reference 102, each call can be uniquely identified. This requires the number of total calls taken within the shortest time period recorded in date reference 102 to be smaller than the total number of integers available in the caller ID 104. For example it may be that date reference 102 includes the second the call came in and caller ID 104 is 4 digits. Since there will never be more than 9,999 calls per second in system 10 each call record 32 can be uniquely identified using date reference 102 and call ID 104.

Calling number 106 is a unique identifier of the telephone number from which the caller is calling. This can be obtained from the telephone provider in many cases automatically. In the UK for instance this is done by a system known as caller line identification and has a CLID or caller line identifier associated with it. Other countries may use a system called ANI or automatic number identification which has a similar effect as far as this disclosure is concerned. In some countries and/or conditions the provision of CLID may not be guaranteed, for example it may be withholdable by the caller. Partly for this reason the system 10 may use the CallID field 104 to identify the call record 32.

Received field 110 stores the date and time the call was received and therefore mimics the date reference 102 field. It can contain additional information such as giving the time in more detail than the date reference 102 (e.g. milliseconds rather than seconds). Date reference 102 is primarily used in conjunction with CallID 104 to provide unique identification and therefore need not record the time to any more detail than the time period taken for the rolling Call ID counter to return to zero. For those reason the received field is used when attempting to determine which of two callers was the earlier to call.

TimeIn 112 contains the time and date the call monitoring component 16 detects that the caller presses a number 1 on the keypad of their phone, which transfers the call to the sales queue for call centre 18. The answered field 114 contains the date and time that the call was answered by call centre 18 whilst cleared 116 stores the date and time that the link to the telephone was ended whether at the end of a sale or by premature termination by the customer. Product ID 118 contains a product code of the product that was on screen at the time corresponding the entry in the date reference 102.

The product code can uniquely identify which product was on screen and therefore which product the customer is attempting to buy. The PriceIn field 120 contains the active price for the unit on screen at the time the call was received, i.e. the received reference 110. Channel 122 stores the channel that the caller was watching, in embodiments in which the auctions are held over more than one television channel, determined by the number the user dialled. For example system 10 may include 3 different television channels, each of which is provided with a separate telephone number. By detecting the telephone number to which calls to call receiver 14 are made it is possible to determine which channel and date they were watching and therefore which auction they are taking part in.

Lastly extension field 124 stores the answering extension number that the call has been referred in the call centre 18. This will only be created after the call has been answered, at the same time as the answer field 114 is populated.

Use of website 20 by a web user will result in the creation of a record in a database with fields which, where appropriate, correspond to those of call record 32. These records may be stored in a separate database or in the call database 30.

Figures 3, 4:
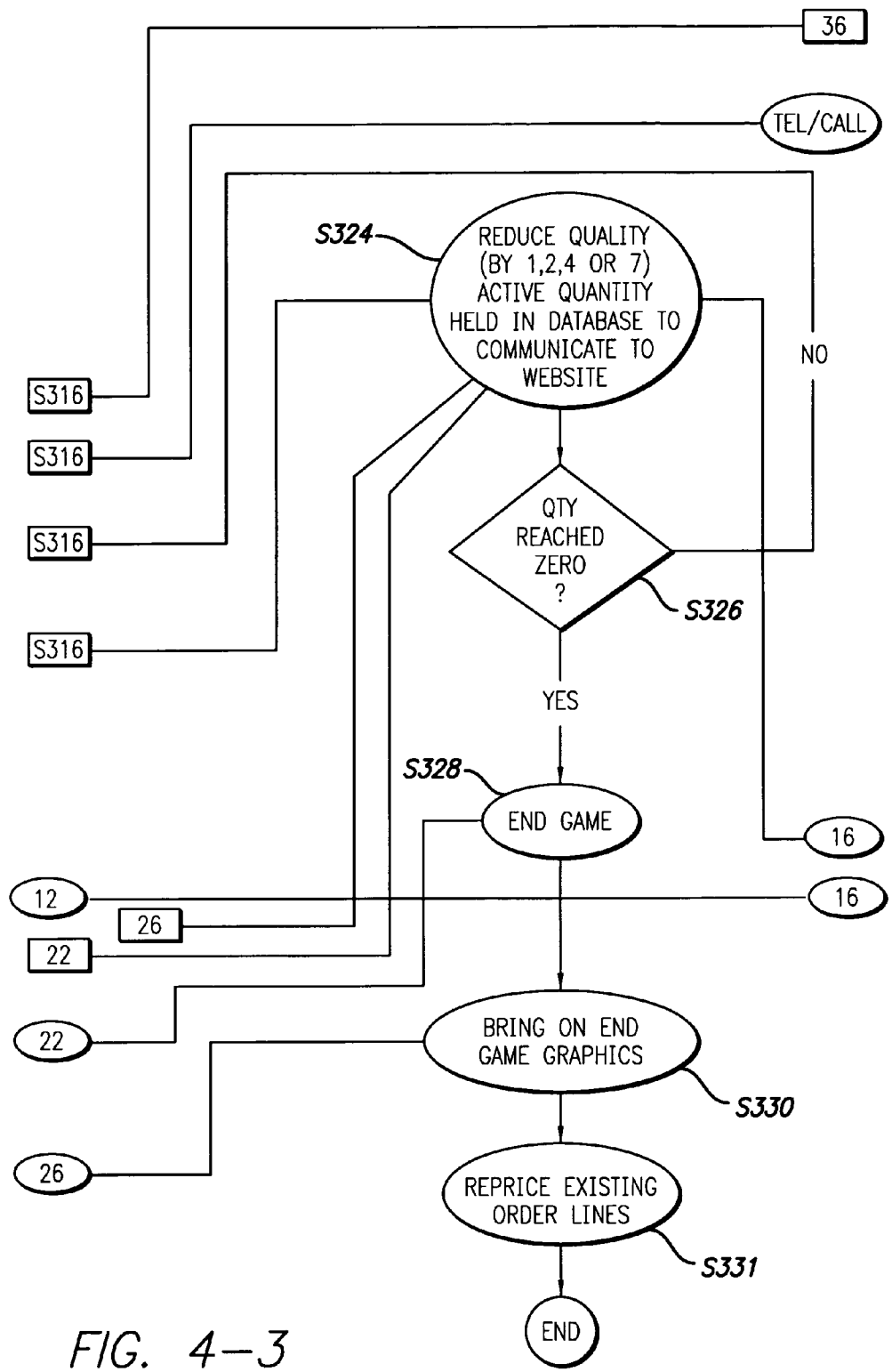
FIGS. 6 to 6-3 are a flow chart of a payment mechanism, FIG. 6 being a smaller scale diagram showing the whole formed by partial views 6-1 to 6-3.
Figure 4:
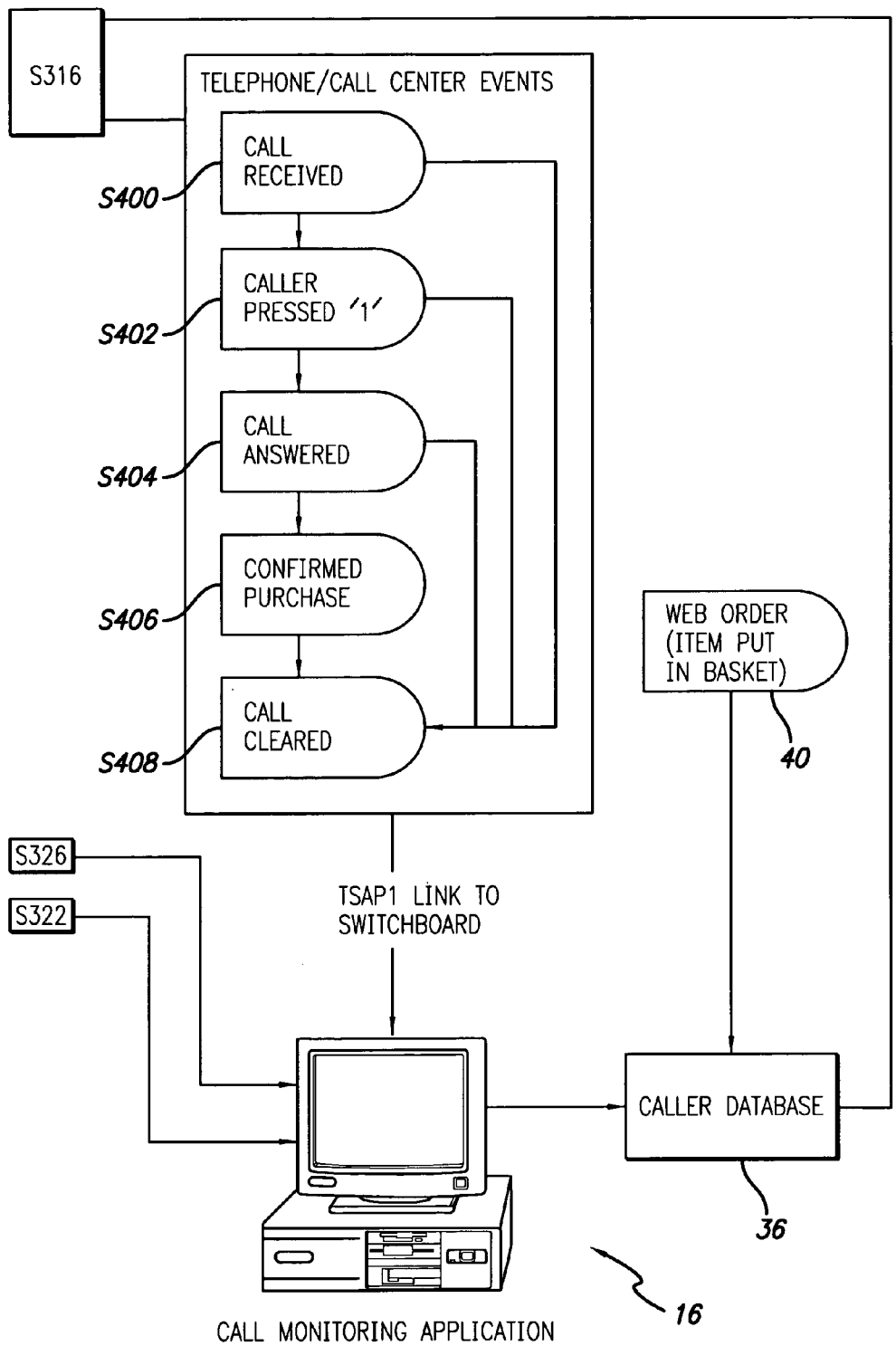

Referring to FIG. 3a there is shown an example of an order record 40. The order record 40 contains fields and acts as an entry in a database. The order record 40 contains the fields of customer name 202, address 204, telephone number 206, product code 208, additional products 210 payment details 212, price 214 and possibly corresponding call ID in date reference 216.

The product code 208 is filled by the communication monitoring system 16 by determining the product code in the call record 32 corresponding to the order record 40. However this may be changed by the call centre 18 if the details are found to be incorrect. The data for the telephone number field 206 may be provided by monitoring component 16 and confirmed by the caller from the CLID or may be taken by the call centre operative at the call centre 18 when conversing with the caller. The address 204 and customer name 202 fields are either successful provided from a customer record 37 or are taken by an operative of the call centre 18. The provision of the additional products field 210 allows the system 10 to sell products that are supplementary to the unit being auctioned e.g. a case and/or a gift box for the auctioned product.

Price field 214 may be filled by system 10 by determining the currently displayed price of the item being auctioned or from PriceIn 120, or from the final price of the auction, stored in game database 22.

Corresponding call ID field 216 can be filled with the data from call ID field 104 and date reference 102 of the corresponding call record 32.

Referring to FIG. 3b there is shown an entry in the customer database 36. The record 37 includes the fields of customer name 222, address 224, one or more telephone numbers 226, 228, 229 and reference number 227.

In FIGS. 4-1 to 4-4 there is shown a process of a reverse auction being conducted. The process starts at step S300. A TV producer 24 may be a person or could be an automated computer following certain predetermined algorithms. It could also be a combination of the two with automated algorithms which can be overridden by an individual person.

At step S302 the TV producer 24 enters a product code for a chosen product. This may be from a predetermined product order list 80 which has been developed to represent the preferred schedule for the day or maybe another arbitrary code. Next at step S304 the computer system 12 recalls information regarding this chosen product from the product database 42 and sends these necessary details to the game database 22 and on to the broadcast graphics computer 26. As well as details of the product itself, the details of previous games using this product are also provided. These will display to the TV producer 24 how well the product sold and at what times. This will allow the TV producer 24, whether automated or a person, to determine when and how the product should sell. This information can be drawn from the product database 42 including its product allocation 44 and also from past history of games stored in the game database 22.

Next at step 306 the computer system 12 questions the TV producer 24 about whether they want to start this game. If the TV producer looks at the previous history and decides it is not suitable for this particular time and therefore decides "no" the process will return to S302. If the producer 24 decides "yes" then the process continues to step S308.

At step S308 the TV producer 24 enters the name of the TV presenter and their own name if the TV producer is a person, and the starting quantity of units. The game is then started at step S312. All of this entered information at step S308 and at S310 is then entered into historical records in game database 22 for future recall at step S304 when the process is repeated.

Certain game graphics will then be generated for viewing by the producer 24, a television presenter and possibly by the public on television at step S314. This can include unit statistics and data sheets at step S318. The graphics shown by broadcast graphics computer 26 are changed by sending data strings to the graphics device and invoking pre written templates.

Once the game starts the call monitoring device 16 will monitor incoming calls and allow TV producer 24 to see the necessary and/or useful information regarding those calls. This also allows for ad hoc graphical messages at step 320 to be broadcast using broadcast graphics 26. These may regard what is currently happening with the current calls and be used to stimulate further demand by, for instance, allowing callers' or web users' names to be broadcast on television when they are making significant calls to acknowledge their contribution and to make people feel that the units are in demand. Other such point-of-sale messages may be broadcast.

Activities at the call receiver 14 and call centre 18 which affect what information is sent to the TV producer 24 occur simultaneously with step S316. These are depicted in FIGS. 4-1 to 4-4 in a separate box with steps S400 through step S408.

At first the call is received at step S400, a new call record 32 is created and the date reference 102, CallID 104, calling number 106, and received 110 fields are completed. The arrival of a call is also notified to the TV producer 24 such as in the form of a display list of each new call and possibly its date reference 102.

Next a caller is greeted with an automatic message asking them to press 1 to place an order, 2 for customer services or 3 to chase delivery or other such call routing mechanism.

When they press 1 at step S402 the monitor component 16 puts them into a sales queue for the call centre 18. The TimeIn field 112 is also completed. Step S402 is also signalled to the TV producer such as by changing the colour of the call details on the displayed list from red to green.

System 12 also looks at the caller line identifier CLID of the caller and uses this to attempt to look up the details of the caller. This is done via telephone number look up component 34 and customer database 36. The CLID, such as in calling No 104, is compared against telephone look up table 34. If a match is found the telephone look up table will then give a reference corresponding to Reference Number 227 in a customer record 37. The name and town of the customer from fields 222 and 224 are sent to the TV producer 24 adding extra detail to the call on the displayed list. The producer does not see or access the CLID directly but does see the located information. System 12 may also gather information from any historical order records 40 that have been linked to that particular customer record 32 and display this to the TV producer 24 allowing the producer to view a caller's previous buying habits.

The TV producer may display some of the information provided using broadcast graphics 26 to the television presenter or to the watching public. This allows a potential bid in a reverse auction from a known user to be placed on the television allowing them to feel like a more active participant.

The use of a separate telephone look up system 34 rather than searching directly in the customer database 36 enables the system to cope with multiple telephone numbers and multiple users of the same telephone number. Whilst the customer database 36 will have a plurality of records 32 each of which may have several, possibly overlapping, telephone numbers entered, the telephone look up system 34 will only allow one name against each telephone number. Commonly this will be taken as the most recent caller to successfully make a purchase from that number. Accordingly it can match this unique number in a system against one particular reference number and look up the name of the person with the corresponding reference number 277 from the customer database 36.

Calls are put into the sales queue in the order which they are received, i.e. in order of the received reference 112, then in turn they are allocated to an extension number in call centre 18. When a call is answered at step S404 by an operative in the call centre 18 the call monitoring application 16 keeps note of which call number (callID 104 possibly in combination with date reference 102), is with which extension number. The answered 114 and extension field 124 in the call record 32 are filled with the time and answering extension respectively.

The next steps may be a confirmed purchase at step S408 and then finally the call being cleared at S410. The two steps S408 and S410 lead to the cleared field 116 in the call record 32 being filled. The confirmation of a purchase at step S406 is signalled to the TV producer possibly by changing the colour from green or red to blue.

The TV producer 24 is given various information during this monitoring process including the details of some callers that have been identified, numbers of calls received, which of those callers have pressed 1, which of those have been answered and which have gone through to a confirmed process. These all constitute preliminary indicators that a sale of a unit and eventual finalised allocation to a user is likely. The TV producer 24 can either automatically use these preliminary indicators of sale (or in the case of confirmed purchase confirmed indicator of sale), or a human TV producer 24 can do so manually. Based on one or more preliminary indicator the TV producer 24 may then proceed to step S322 or step S324.

When the TV producer 24 does not believe that enough calls have been received or that enough products are being sold, the TV producer is likely to proceed to step S322. At this point the TV producer 23 enters a reduction in price to be made and then returns to step S316. The price can be reduced by only a limited amount, such as £1 or $1, or the producer 24 may instruct a so called "price crash" where there is a dramatic drop in price signalled by suitably vibrant and prolific graphics accompaniments from the broadcast graphics 26. The reduced price is stored in the game database 22, in a location from which this data can be easily copied to the PriceIn field 120 of any new calls and the Price field 214 of any new orders. The game database 22 may signal a lowest possible price that a product is allowed to be reduced to, to stop a producer selling at too much of a financial loss.

Dependent on the preliminary indicators from events at call receiver 14 and call centre 18 the TV Producer 24 may reduce the available quantity of products. Advantageously the user does not have to wait for a confirmed purchase at step S406 to do so. Waiting for a confirmed purchase would make the auction very slow, the quantity would only reduce slowly down and the reverse auction would take a significant length of time.

Additionally there would be a significant strain on use of the limited telephone switchboard capacity by new callers seeing the high remaining number, and calling in when in reality they would have little chance of winning due to the number of callers before them who plan to buy but have yet to get to step S404. Always waiting for step S 406 to be completed before proceeding to step S324 will result in a large callers/web users to sales ratio with lengthy TV with website times and space being used for each auction. Since telephone switchboard capacity, television broadcast time and internet bandwidth, linking to website 20, are limited resources this is technically inefficient.

Instead the TV producer 24 may use any number of the preliminary indicators which include the time of a call, the number of calls received and calls being received at S400, a caller pressing 1 at S402, a call being answered at S404 or any of these when compared to the caller or the product's sales history and the historical likelihood of one of these events occurring at the time within the auction resulting in a confirmed sale at step S406. Most commonly the TV producer 24 will use the caller pressing 1 at S402 as the indicator that a unit is likely to be sold to that caller. The user may also take into consideration whether to reduce the quantity when the caller presses 1, whether the auction is at a suitable time and also the history of that customer if they have been identified. For example on certain games it is found from a TV producer's experience/events stored in game database 22 that calls at the very start of the auction who press 1 lead to queries being made about previous products by callers trying to bypass an enquiries system by going through the auction route, rather than lead to a sale. Accordingly this may not lead to a reduction in quantity at step S324. Alternatively, the TV producer can override these normal instincts/instructions by taking into account callers' track history, for instance they may recall a customer or determine from stored records their past behaviour, which leads them to indicate that even pressing 1 at a normally unsuitable time can be relied upon as likely to result in a sale in this case. All of this can be done by automatic algorithms based on past games in the game database 22.

At Step S324 the TV producer 24 may reduce the quantity by any number dependent on the activities of the calls that have been monitored. Next at step S326 computer system 12 determines whether the stored quantity of objects for the current game has reached zero. If not then it returns to step S316. The TV producer 24 is prevented from reducing the quantity to a level below the start quantity less total calls received at step S400 less orders in the game and orders on the website (an order meaning the placing of a unit into the shopping cart).

A reduction in quantity results in a stored preliminary available quantity in product allocation 44 being reduced by that number. This preliminary available quantity is displayed using broadcast graphics 26 to the presenter and public.

Once the preliminary available quantity reaches zero at step S326 the process proceeds to step S328 where the game is ended. This ending is recorded in game database 22 and leads to step S330 where end game graphics are prompted and sent to the broadcast graphics component 26. Lastly at step 332 there is the re-pricing of existing order lines Order records can be completed and the purchase confirmed at step S406 before the game ends and therefore a re-pricing mechanism needs to be in place to reduce the price of any order lines placed for a higher price than the games lowest final price. That is in order records 40 the field price 214 which was based on the price in field 120 of the accompanying call recorded, or present price when the order was converted, is reduced to the final price stored in the game database 22 from reductions at steps S322. This check takes place for all games completed in the last 30 minutes, but could be over any time period The lowest price does not have to include web games on web site 20, which can operate in isolation, but may do so. The total order needs to be recalculated, including any vouchers that have been provided such as vouchers which offer a percentage reduction after re-pricing an order line.

A web order WO can also be made via a web site 20. An online customer generally should be pre-registered and once registered and logged in they can click on an item to place in their shopping cart. Web auctions can run independently or the web site 20 can be an alternative medium from which to enter a televised auction. In the latter case the TV producer 24 is shown web order WO on the display list and will usually mark this as a preliminary indicator The TV producer 24 can be prompted to reduce the quantity at step S324 given the preliminary indicator of a web user putting a unit in a shopping cart, in a manner conventional to websites enabled for product purchase. As with other preliminary indicators, the producer may hesitate to reduce a quantity, especially if the event takes place earlier in the game when the price is still high, as customers can test the web site by placing units in their shopping cart and removing them a few seconds later.

The click to buy which puts a unit into the shopping cart must take place before the end game 328. However the check out process may take place a number of days after the unit is placed into the shopping cart. This would require full payment details including typically card holder address, delivery address and payment details. The unit can be placed as a new order record 40 or can be added to an existing order record 40 so that the customer saves on delivery charges. Such a purchase can then be confirmed by e-mail.

Figure 5:
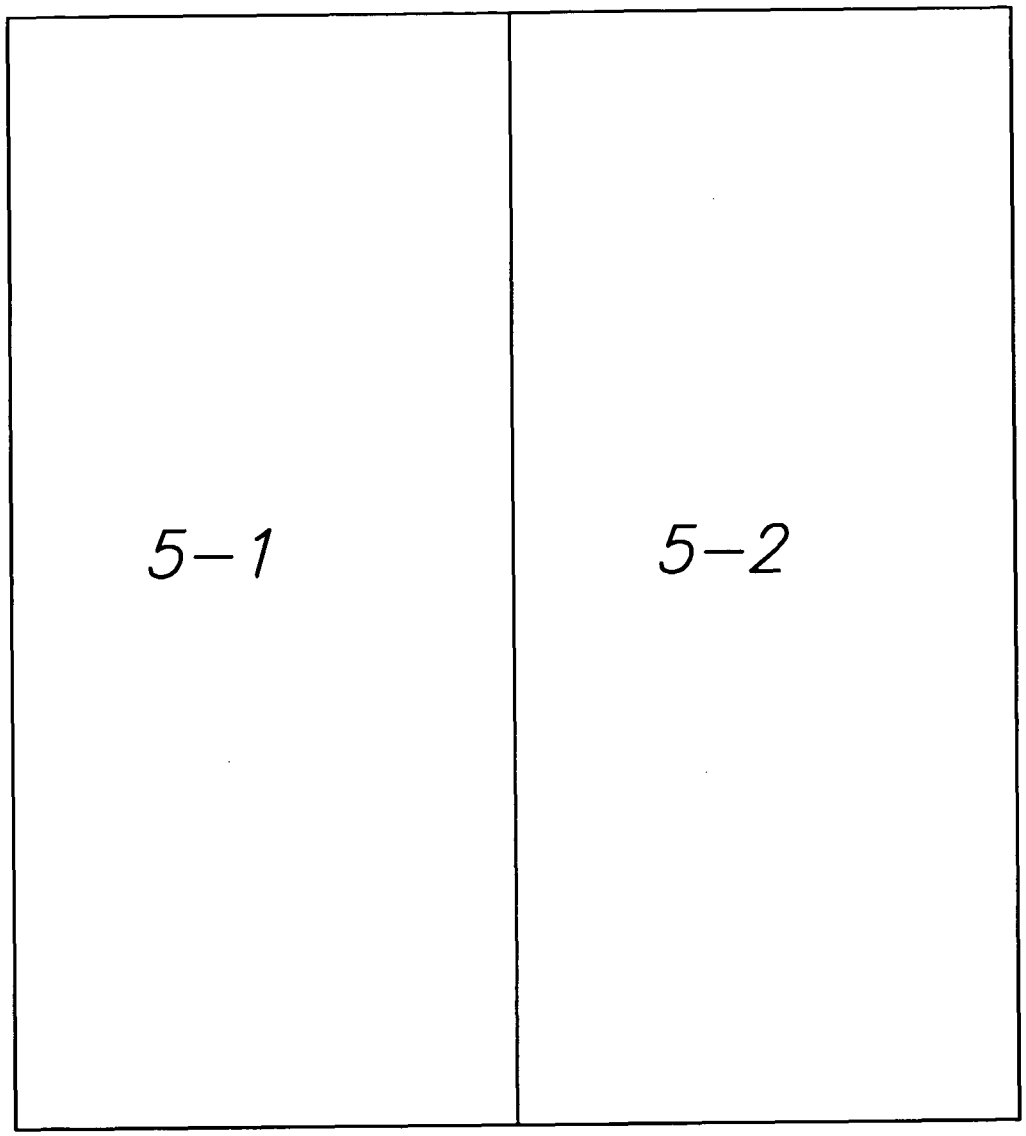
Figures 1, 5:
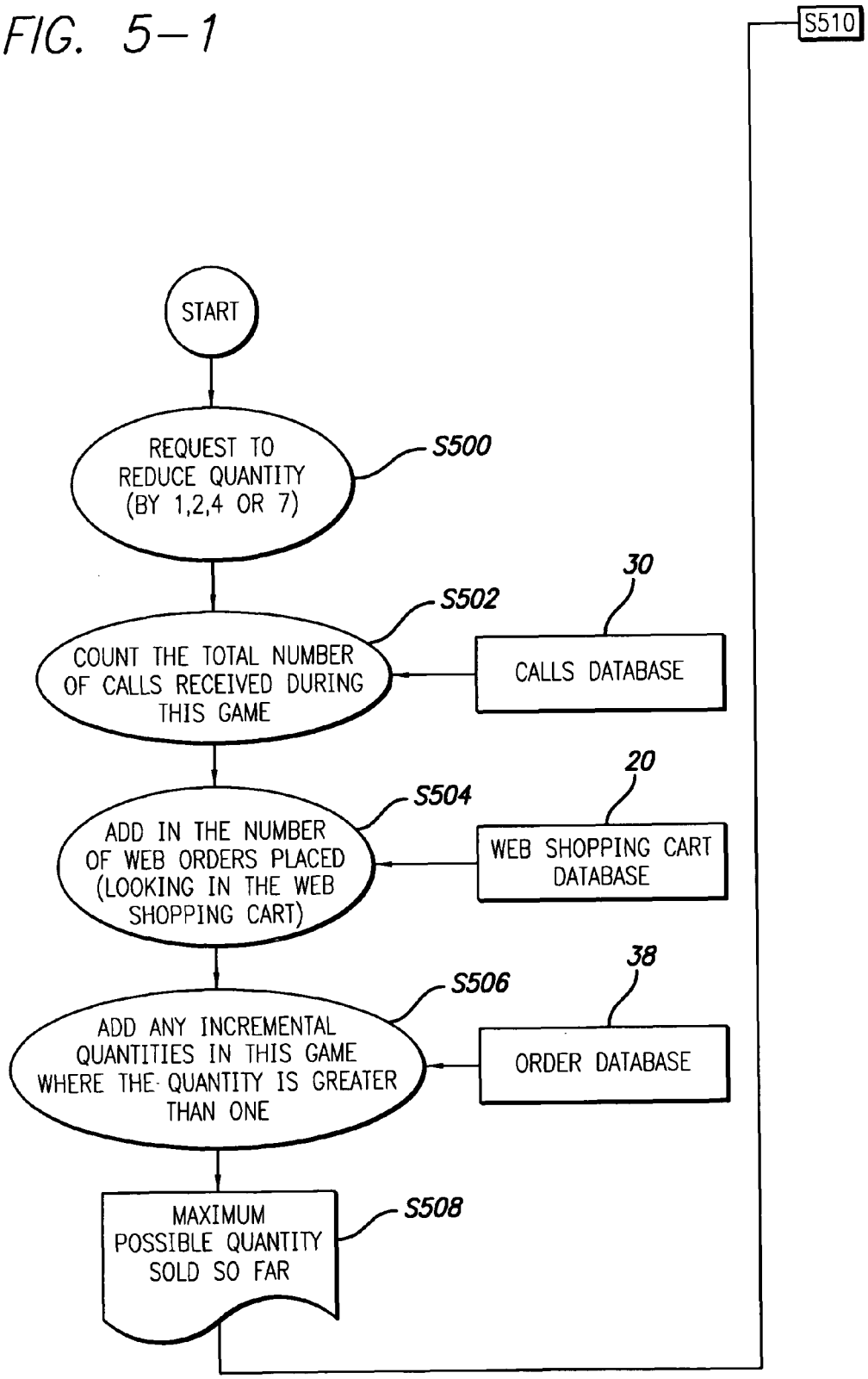
Figures 2, 5:
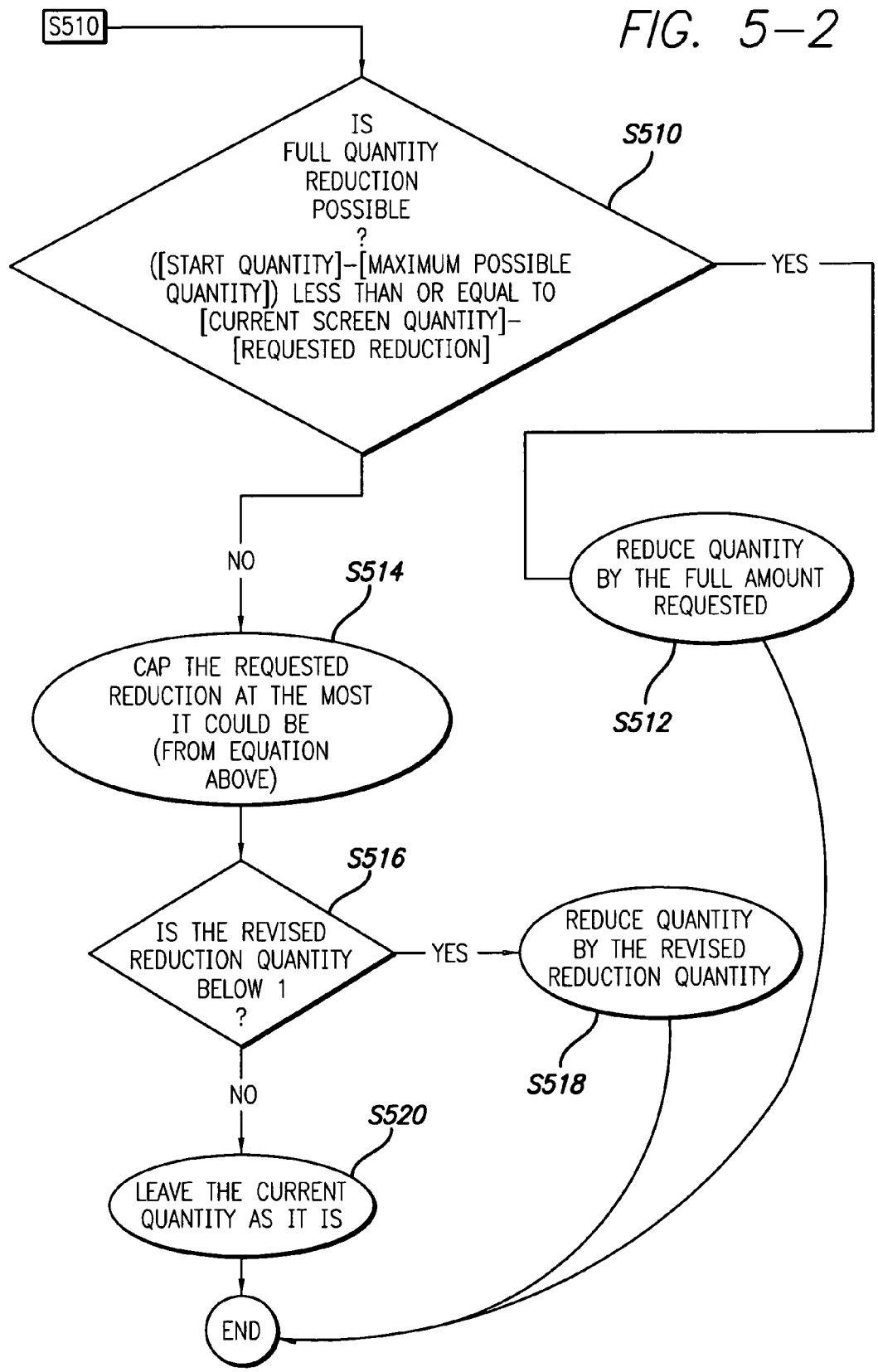
Figure 6:
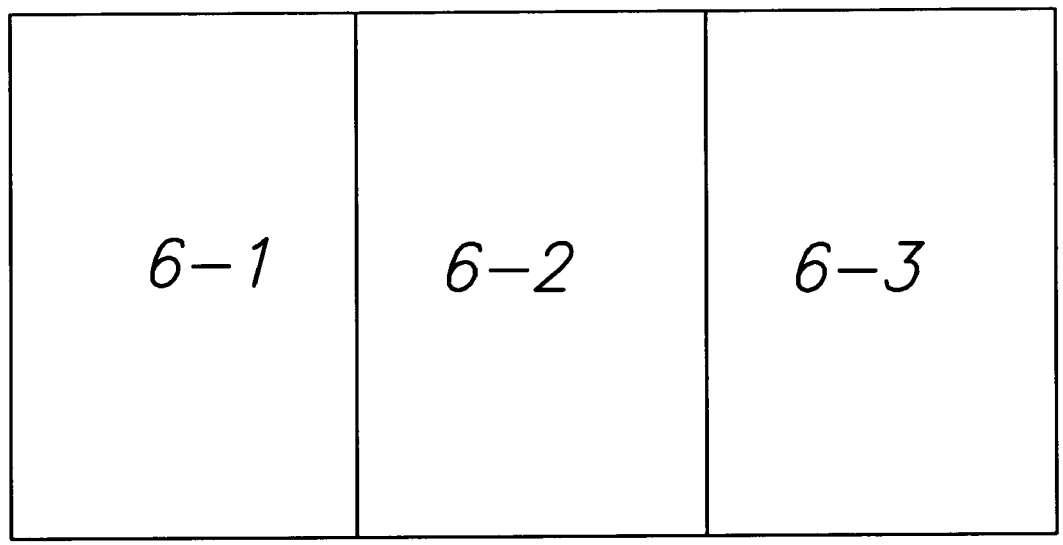
Figures 1, 6:
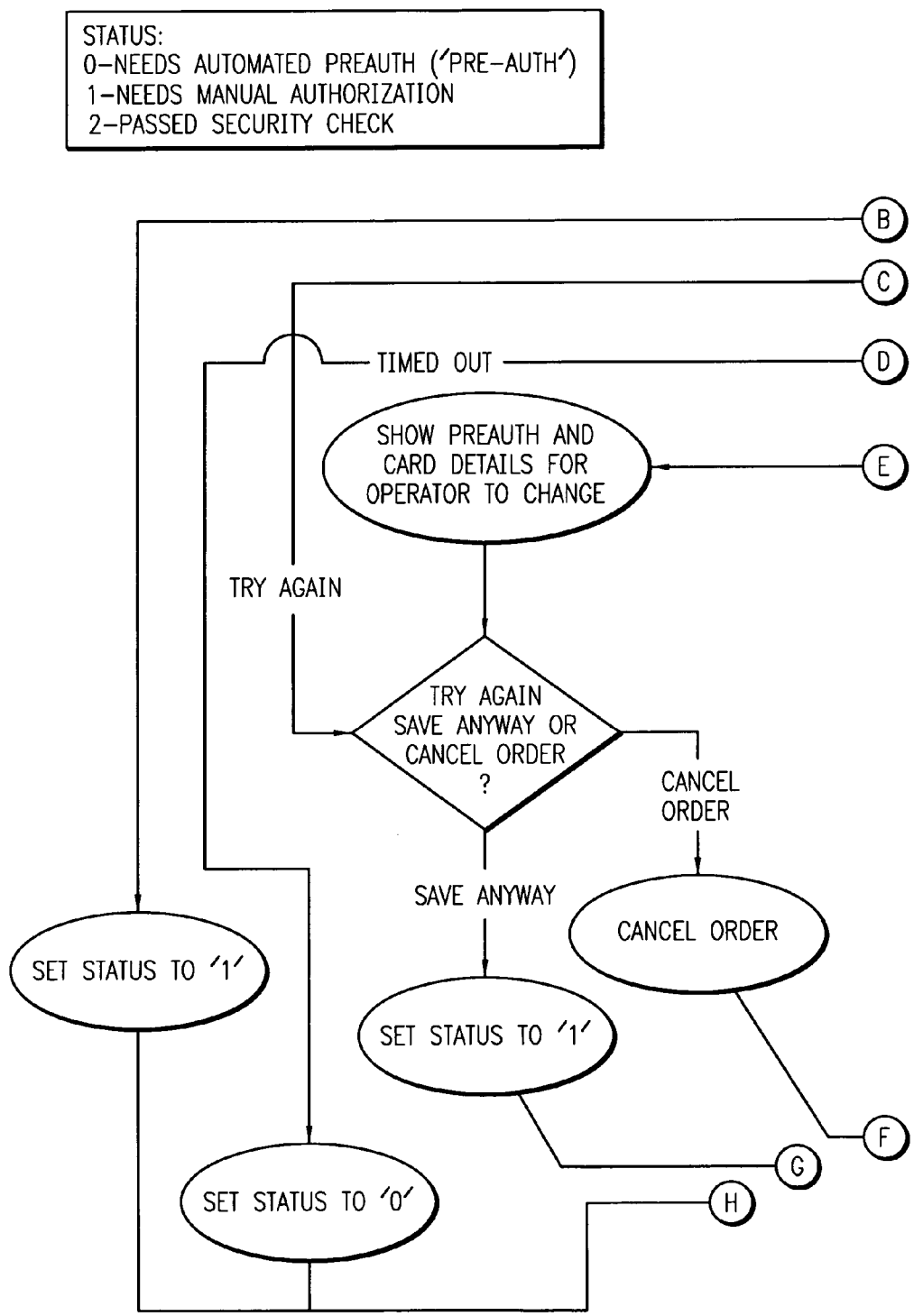
Figures 2, 6:
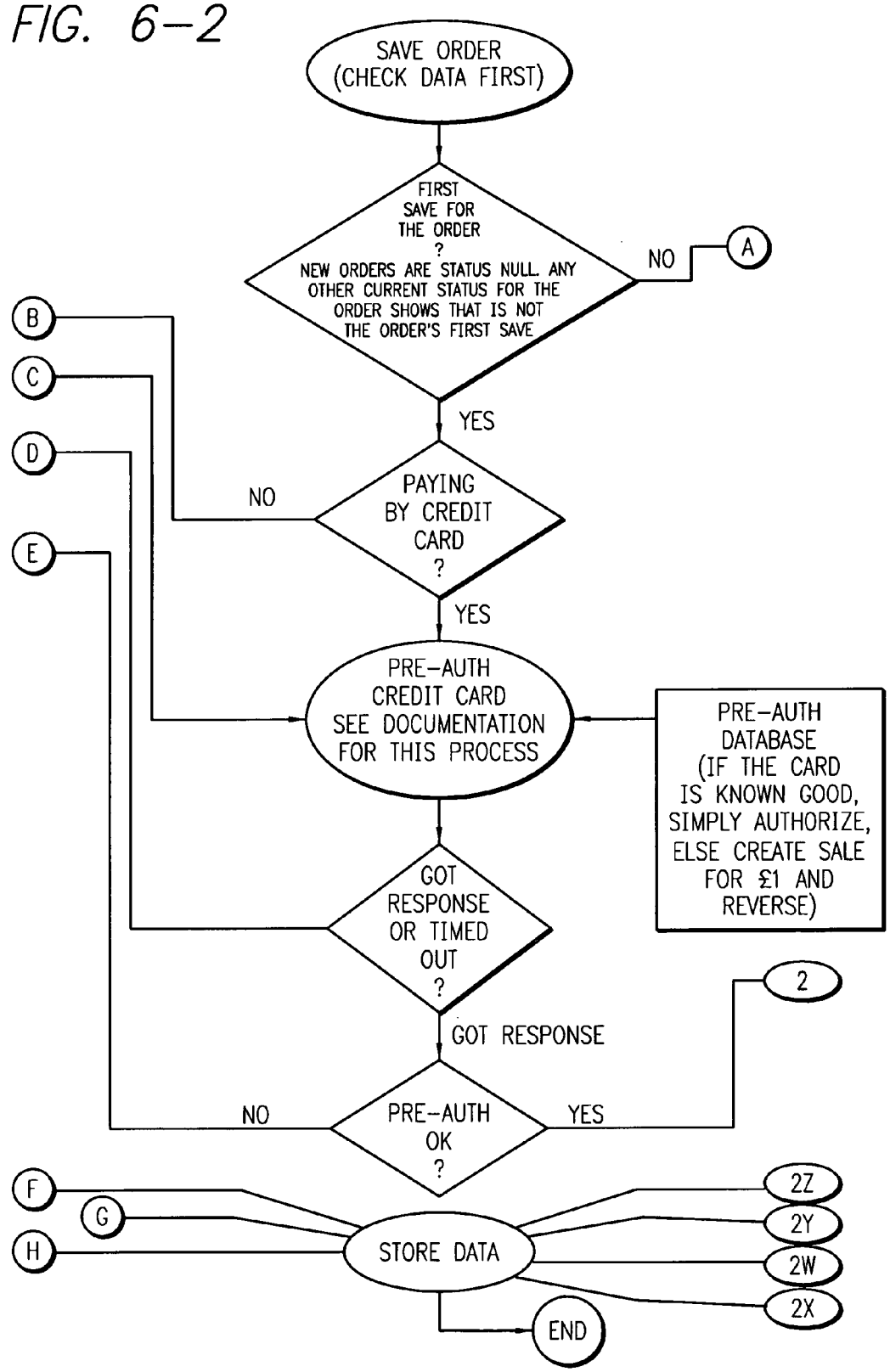
Figures 3, 6:
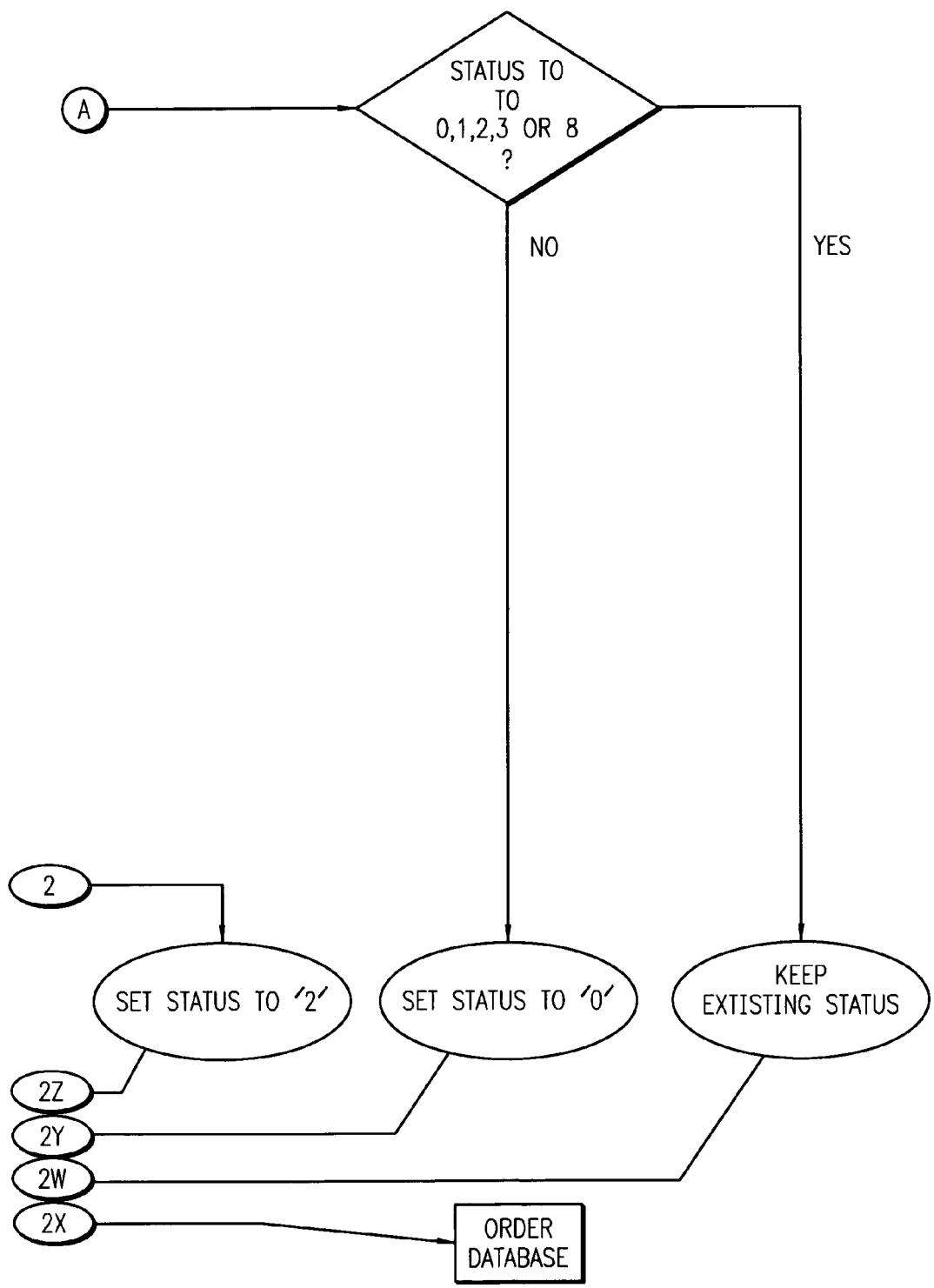

Referring to FIGS. 5-1 to 5-2 there is shown a process of dealing with requests to reduce the preliminary available quantity made by TV producer 24 at step S324.

First at step S500 the request to reduce the preliminary available quantity by an amount is received. Next at step S502 processor 13 accesses the call database 30 and counts the total number of calls received during the game. Next at step S504 the total number of calls is added to the total number of web orders WO stored in a database of system 12 or stored at a server or server hosting the web site 20 corresponding to the present game.

At step S506 the system adds any incremental quantities in the game where the quantity is greater than one from the order records 40. When a caller is put through to the call centre 18 it may be permissible for the caller to buy more than one of the units in the auction. So if instead of buying one product they were to buy five, this would be recorded in additional order records 40 in the order database 38 and could be added at step S506. At step S508 the maximum possible quantity that could have been sold is calculated from the addition of the number of calls, number of web orders and any additional sales from steps S502, 504 and 506. From this at S510 the processor 13 of computer system 12 calculates whether the full quantity reduction requested is possible by calculating whether the start quantity minus the maximum possible quantity sold is less than or equal to the current screen quantity minus the request of the reduction.

If the answer at step S510 is "yes" the system 12 proceeds to step 512 where the preliminary available quantity of product allocation 44 is reduced by the full amount requested. Using the allocation 44 the quantity remaining displayed on the screen is reduced by the requested quantity and stored in the database for the web synchronisation. It then proceeds to the end of the process step S522. The main auction process will then continue to step S326.

If a full quantity reduction is not possible at step S5 10 because the TV producer 24 is attempting to reduce the number to below the maximum possible quantity that could be left unsold the system proceeds to step S514 where the reduction is capped so that the preliminary available quantity in product allocation 44 is reduced to the start quantity minus the maximum possible quantity that could have been sold. Next at step S516 the processor 13 of computer system 12 determines if the revised reduction is below 1. If it is not below 1 the process continues to step S518 where the quantity is reduced by this new revised reduction and the system proceeds to step S326. If the revised reduction is below 1 (i.e. zero) then the current preliminary available quantity is not reduced at all at step S520 and the process continues to step S326 and goes back to S316.

Figure 7:
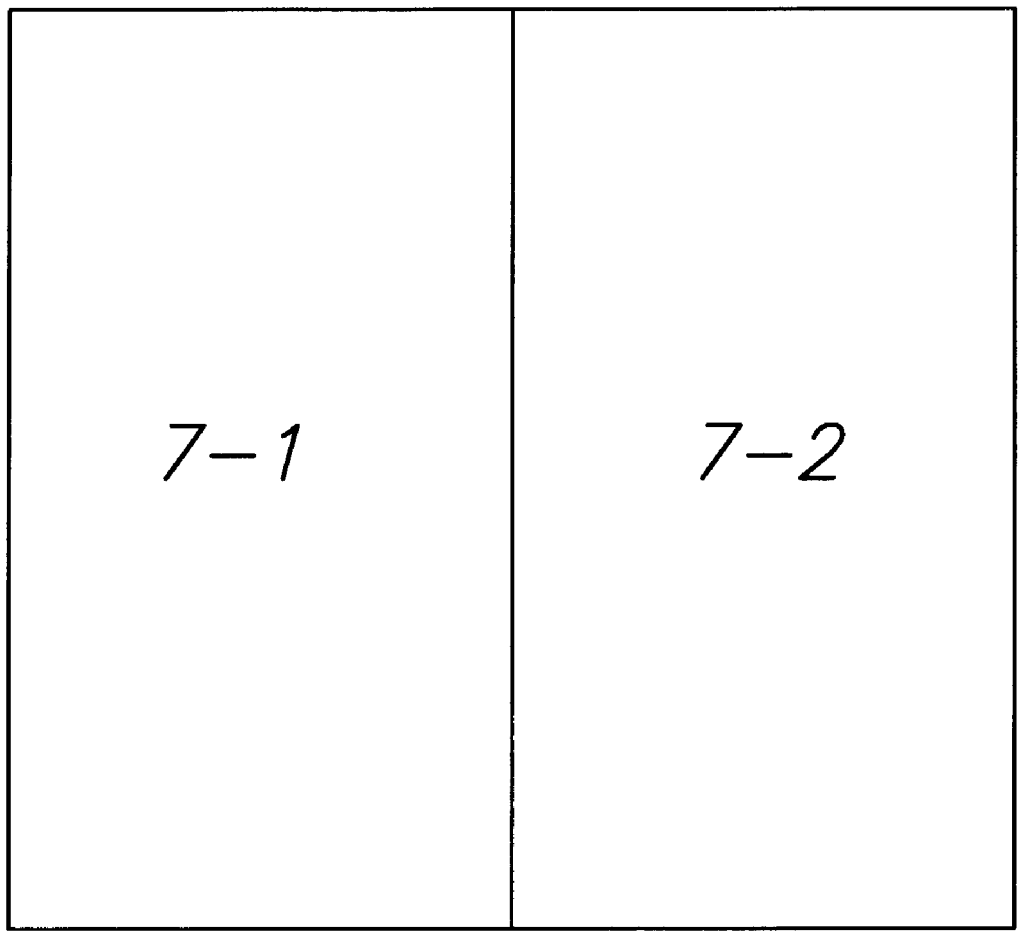
Figures 1, 7:
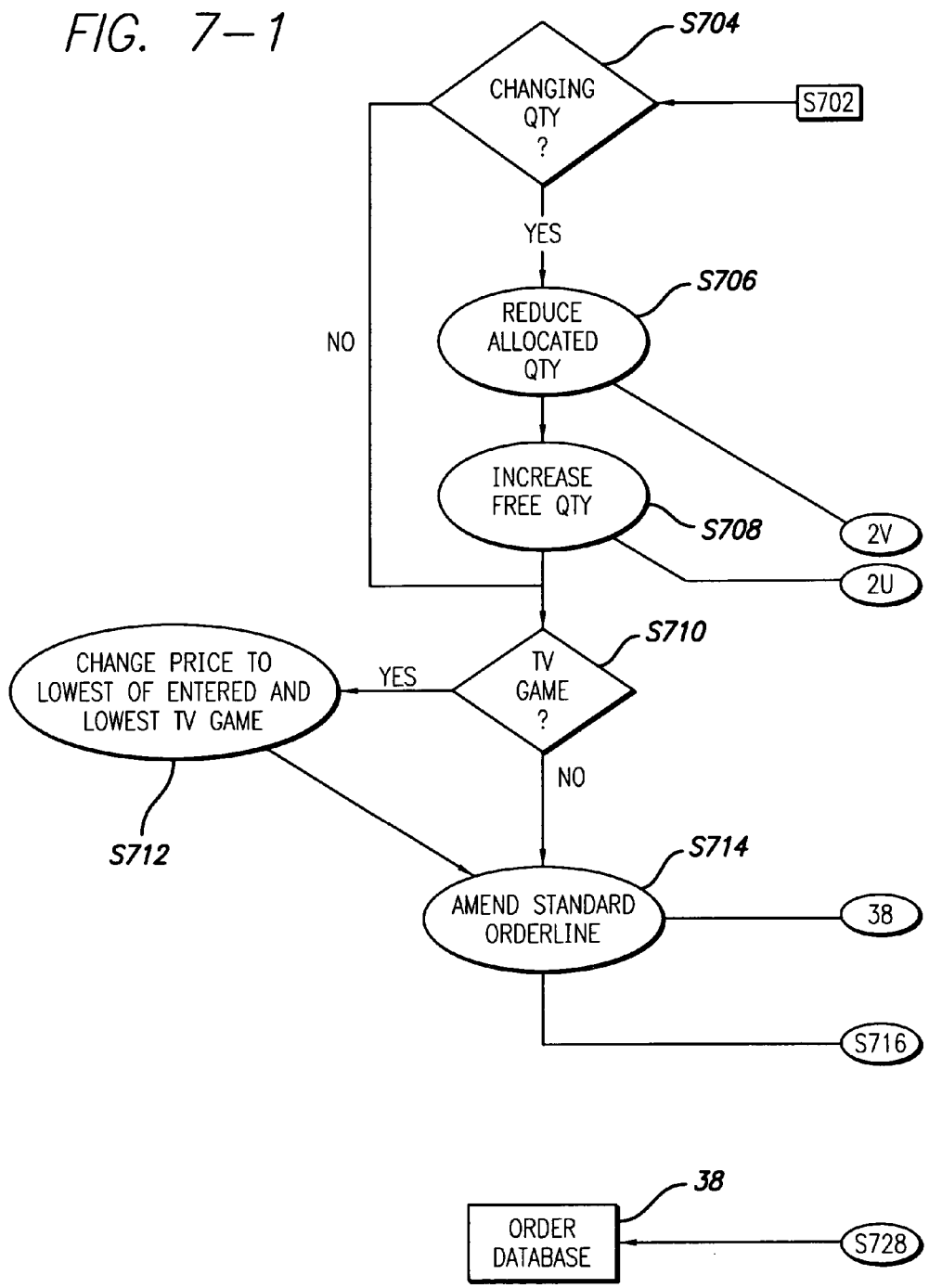

In FIGS.7-1 to 7-2 is shown the process of amending an item on an existing order by a call centre operative. At step S700 the operative attempts to amend an item. At step S702 the operative determines whether the product is standard or an ex-demonstration product. If it is standard it proceeds to step S704 and if it is ex-demonstration is goes to step S718.

At step S704 the operative is asked by computer system 12 whether it is wished to change the quantity of units on the order. If the answer is no then it goes directly to step S710. If the answer is yes it goes to step S706. At S706 the operative reduces the allocated quantity and this is represented in product allocation 44 in the product database 42 with the allocation being reduced. Accordingly the free quantity which can be still sold and allocated to people is increased at step S708. This is also recorded in the product allocation components 44 of product database 42.

At step S710 the system 10 determines whether the current game is a TV game or merely a web based game only. If it is a TV game it precedes to S712 and if not it goes to step S714. At S712 the price is changed to the lowest entered in the TV game. At S714 the standard order line is amended and this is recorded in the order database 38. Then at step S716 any vouchers are recalculated and the system proceeds step S726.

Steps S718, S720 and S722 are identical to steps S704, S706 and S708 except that it is the special component of the product allocation component 44 that deals with ex demo allocated quantities that are changed. The system will then to proceed to Step S724 where the ex demo order line is amended and recorded in database 38. The system then proceeds to step S716.

At step S726 the carriage, VAT and order totals are recalculated and these details are saved at S728 in the order database 38.

Figure 8:
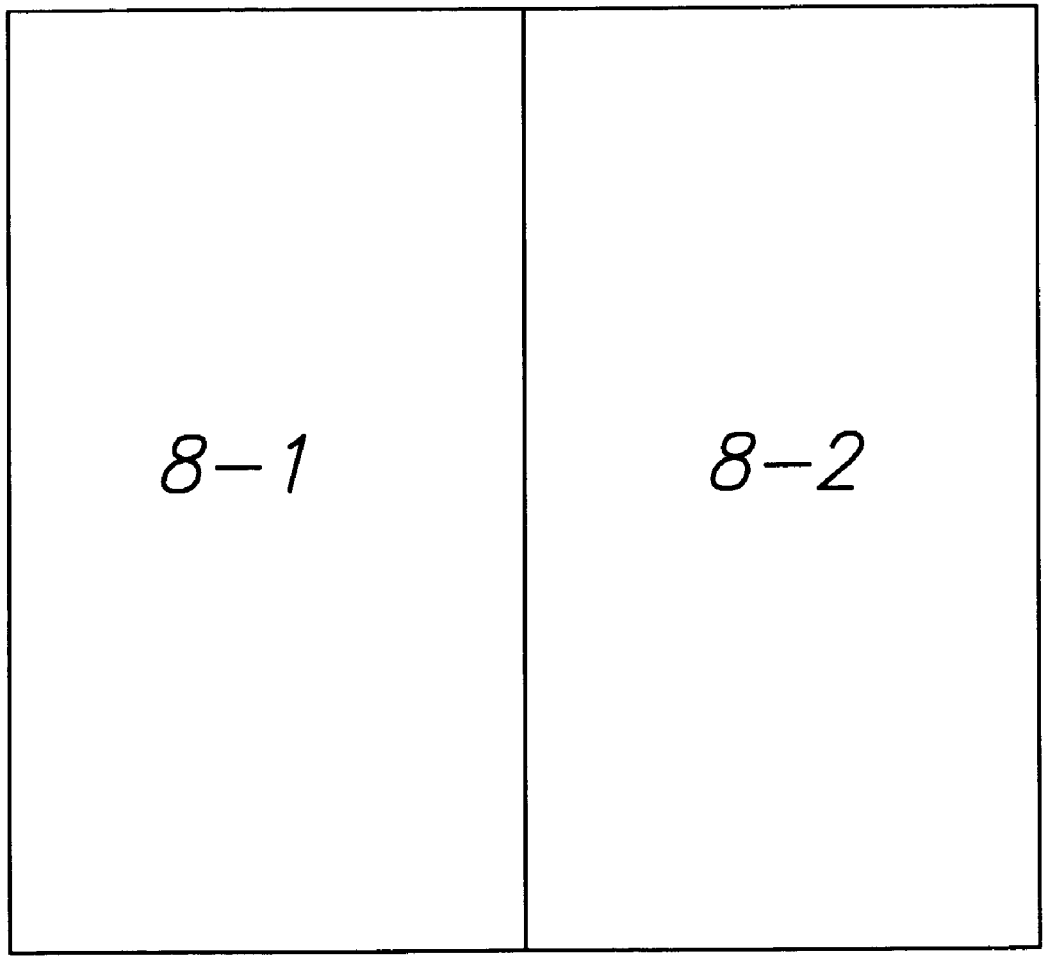
Figures 1, 8:
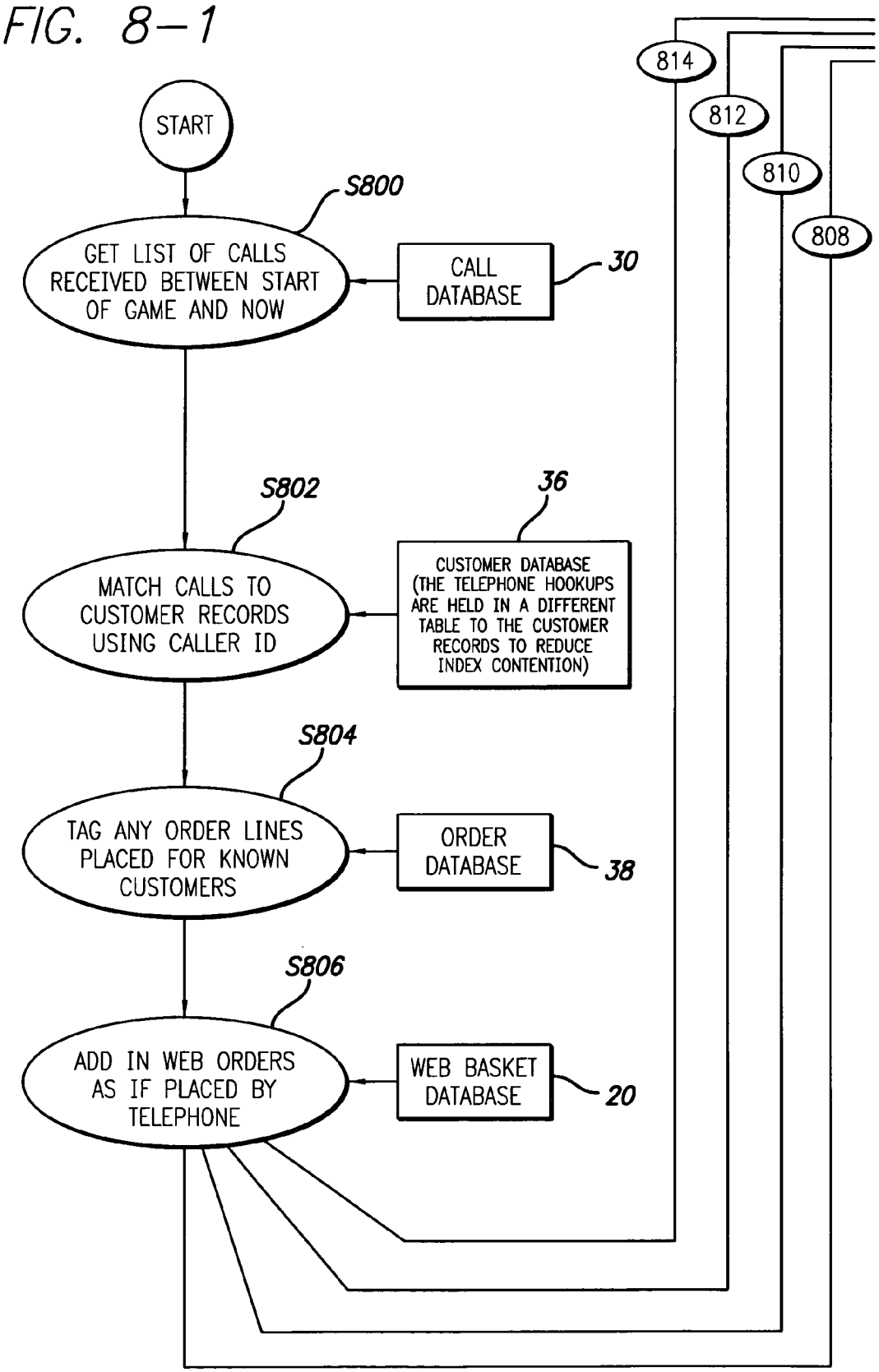
Figures 2, 8:
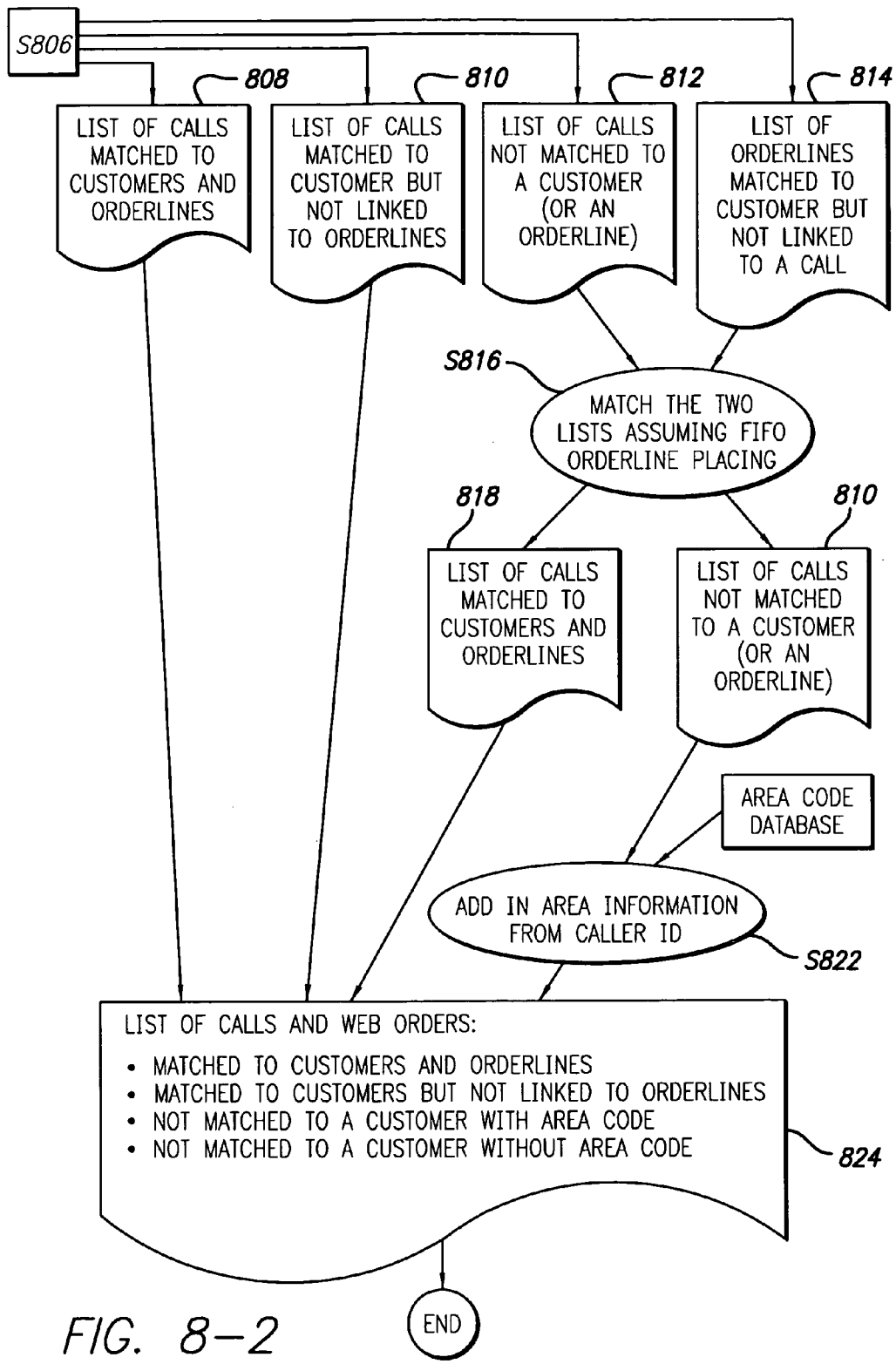

In FIGS. 8-1 to 8-2 is shown the process of matching calls and orders. Occasionally customers can drop out of the game after pressing 1 at step S402 but before the call is answered at step S404. Additionally customers can decide not to buy after speaking to the operative at call centre 18 after the call is answered at S404 so that step S406 is never realised. Also an attempt can be made to confirm purchase at step S406 but the payment details may not clear authorisation or be correctly taken. In such cases it will normally be that they have given enough preliminary indicators that it is likely that their call will have resulted in the TV producer 24 reducing the preliminary available quantity in allocation component 44 at step S324, but will not have resulted in a sale or increase in the final allocation in allocation component 44. Accordingly it is possible that after the auction is finished that not all units will have been sold. It is then possible to call such customers back and invite them to order the unit at the closing price of the auction.

In one embodiment, when that is the case, any customers who pressed 1 at step S402 but did not buy are contacted, since they registered some form of interest, even if they hung up before the call was answered. Such customers may be already registered so that their CLID can be positively matched against a record in the customer database 36 or they may be unregistered.

In order to allow the correct people to be contacted the system 12 matches call records 32 against order records 40 so that people who have already ordered are not called.

At step S800 a list of calls received between the start and the end of a game (S312 and S328) are obtained from the call database 30. At step S802 these call records are matched to customer records 37 using the telephone look up system 34. Alternatively the Call ID 104 and date reference 102 are entered by the communication monitoring component 16 into the additional field 216 in all new order record 40 and call records 32. The order records 40 are then matched without need for the telephone look up system 34 by comparing data in fields 216, 102 and 104. At step S804 any order records 40 which were placed by customers known in the customer database 36 are tagged this includes consideration of subproducts where size and/or colour options are offered. Next at step S806 web orders WO are treated as if placed by telephone.

From the results of steps S804 and S806 there are order records 40 which are tagged to customer records 37 and these can then be tagged to call records 32 which were known to match those customers' records at step S802.

Accordingly steps S800 to S806 result in four separate lists, a list of calls matched to customers and orders 808, a list of calls matched to customers but not linked to order lines 810, a list of calls not matched to a customer or an order 812 and a list of order records 40 matched to a customer record 32 but not linked to a call record 32, 814.

Lists 808 and 810 are sent to form part of a final list 824. The two lists 812 and 814 are compared at step S816 where these two lists are matched assuming a first in first out order line placing. Whilst it is simplistic to assume first in first out it does result in a sale being matched to a call record 32 even if it was a different caller. Step S816 results in two lists, a list of calls matched to customers and order lines 818 which is sent to form part of the final list 824 and a list of calls not matched to a customer 37 or an order record 40, 820.

At step S822 the list 820 has area codes information added from any caller line identifier in the calling number field 106 looking up area codes and their respective areas from existing conventional databases. After step S822 this supplementary version of list 820 is also put into the final list 824. Accordingly the final list 824 contains lists of call records 32 and web orders which are matched to customers and order records 40 which are matched to customer records 37 but not linked to order records 40 but are not matched to a customer that has an area code or not matched to a customer without area code, the latter occurring for instance where there is no CLID because the number has been withheld.

The list of calls containing a data entry in the TimeIn field 112 which have not been linked to an order record 40 but for which the CLID is available may form the basis of customers called back to sell any unsold products after the game has ended and all calls received for that game have been cleared.

Figure 9:
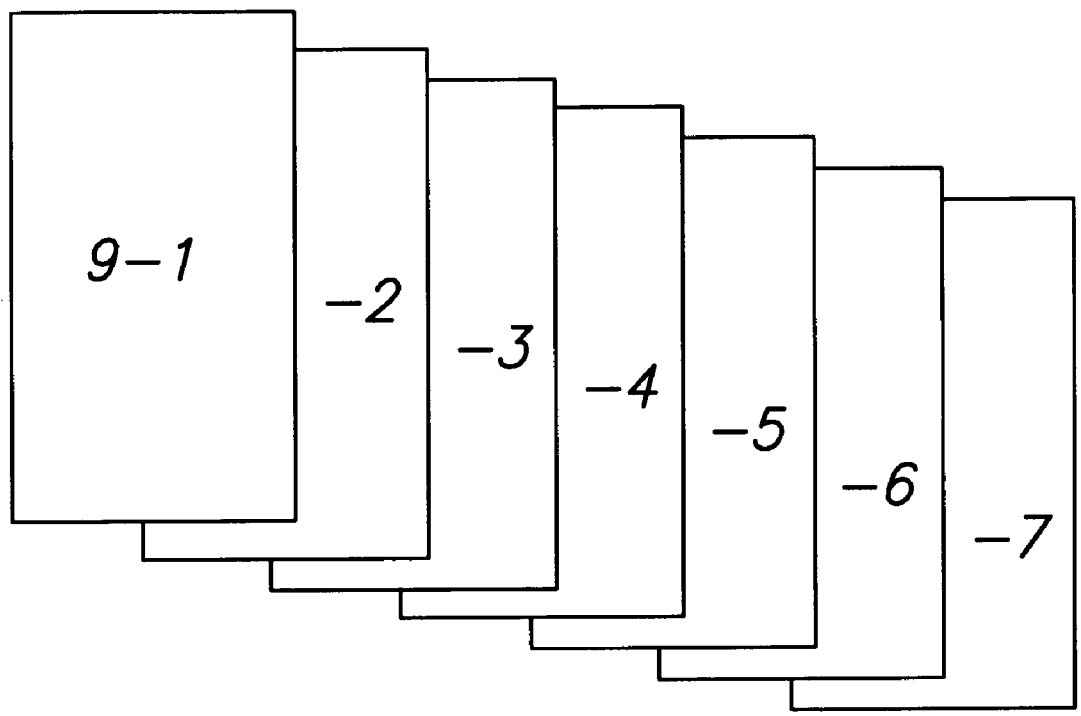
Figures 1, 9:
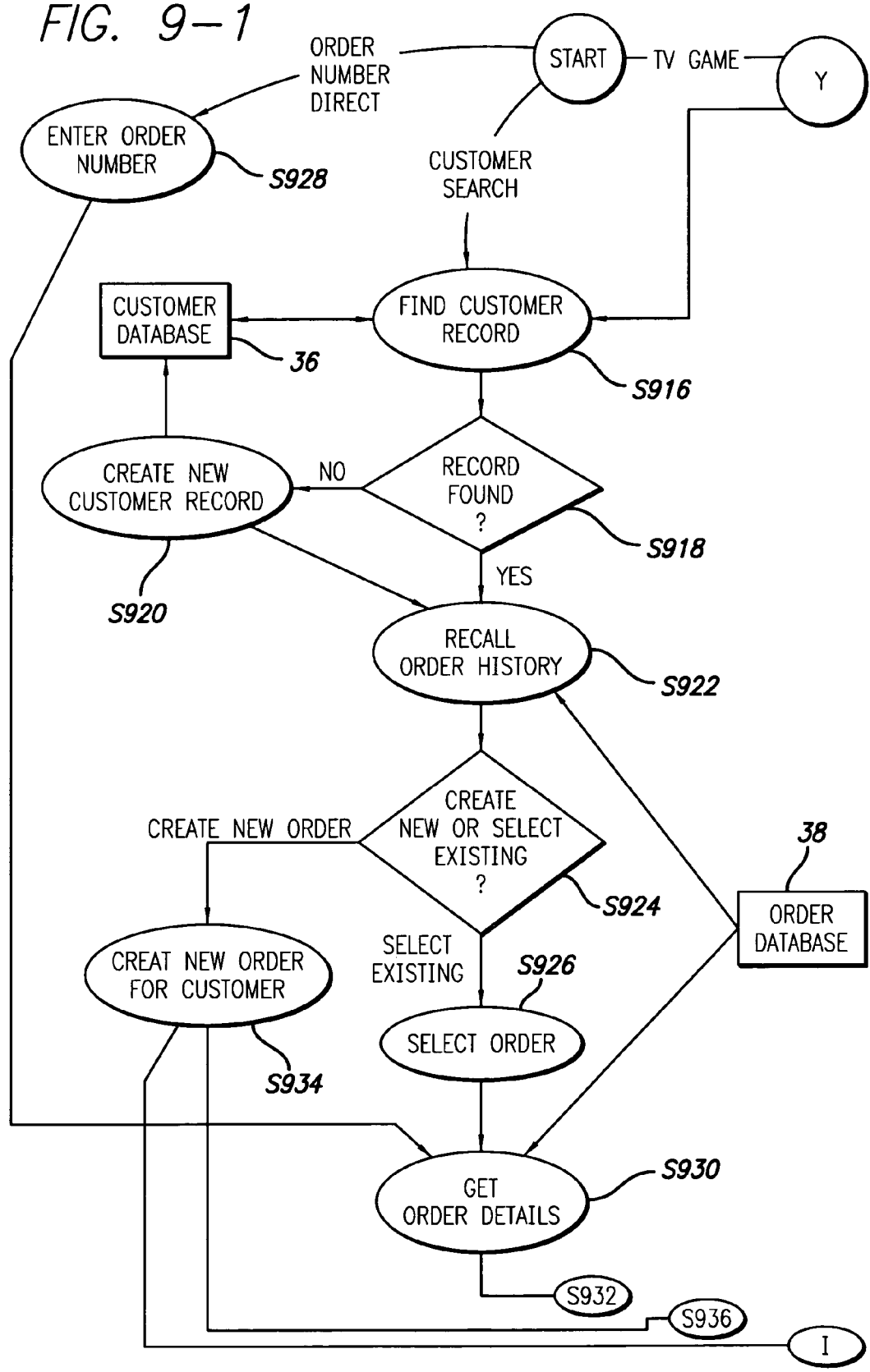
Figures 2, 9:
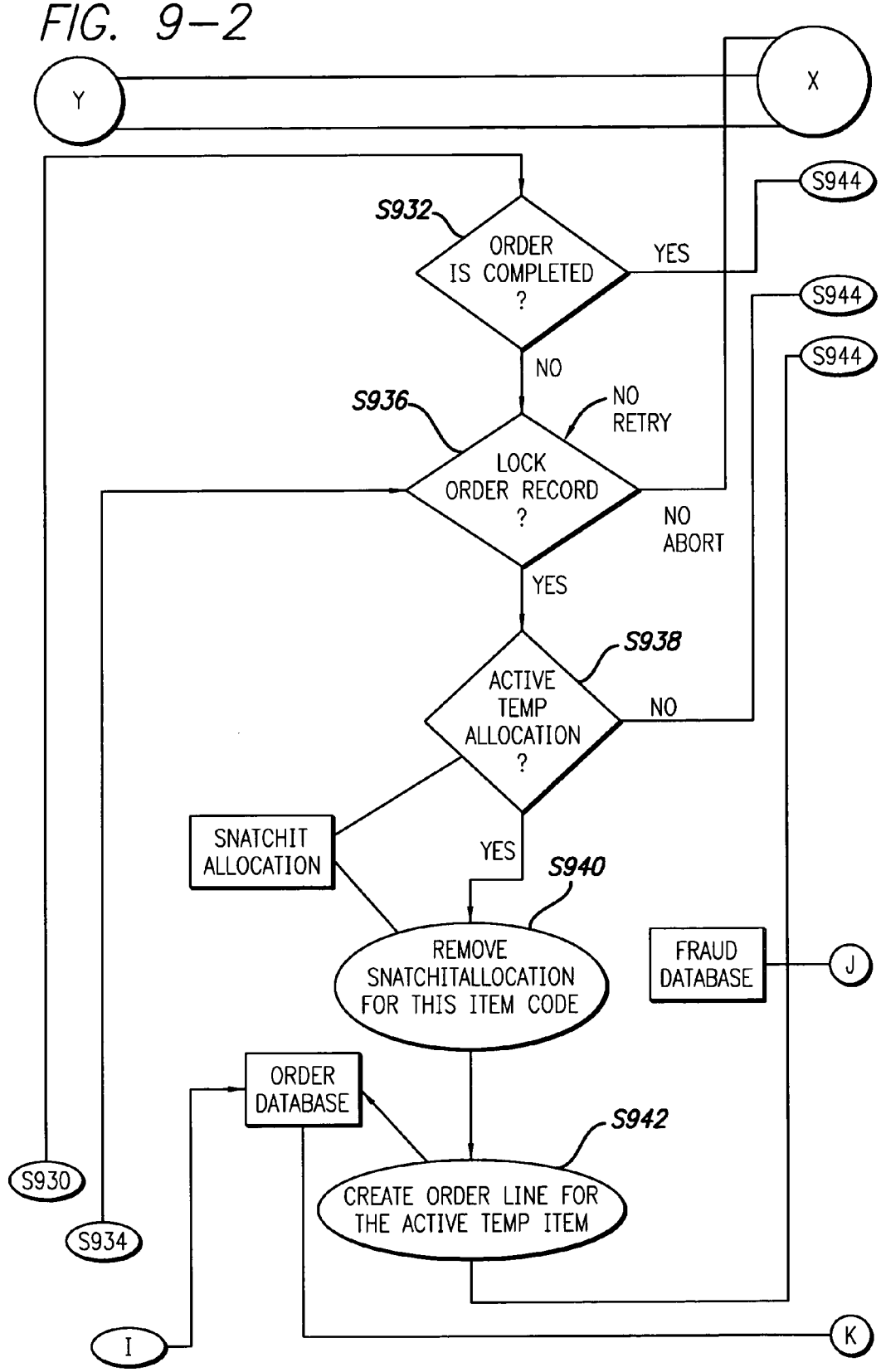
Figures 5, 9:
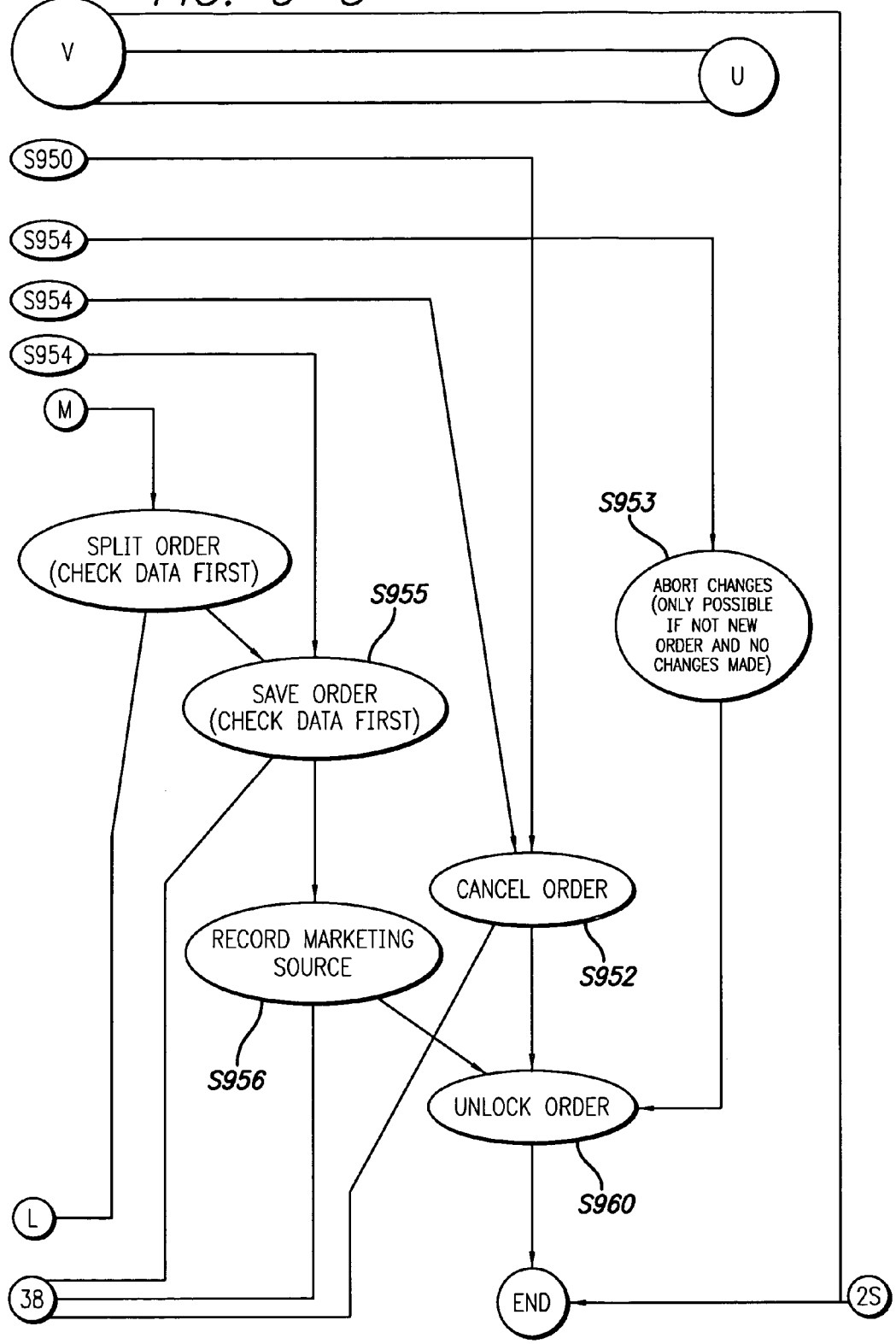
Figures 6, 9:
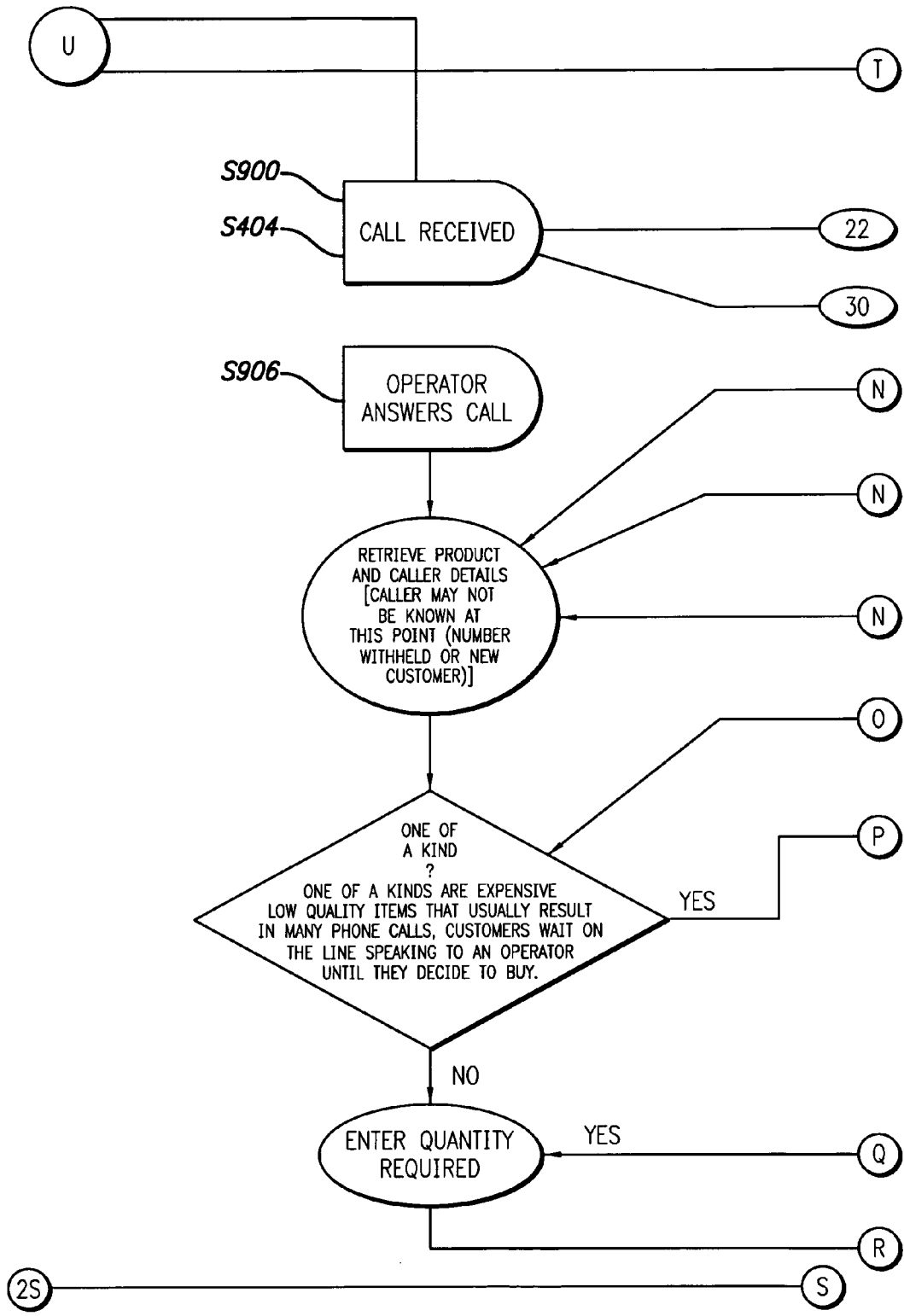
Figures 7, 9:
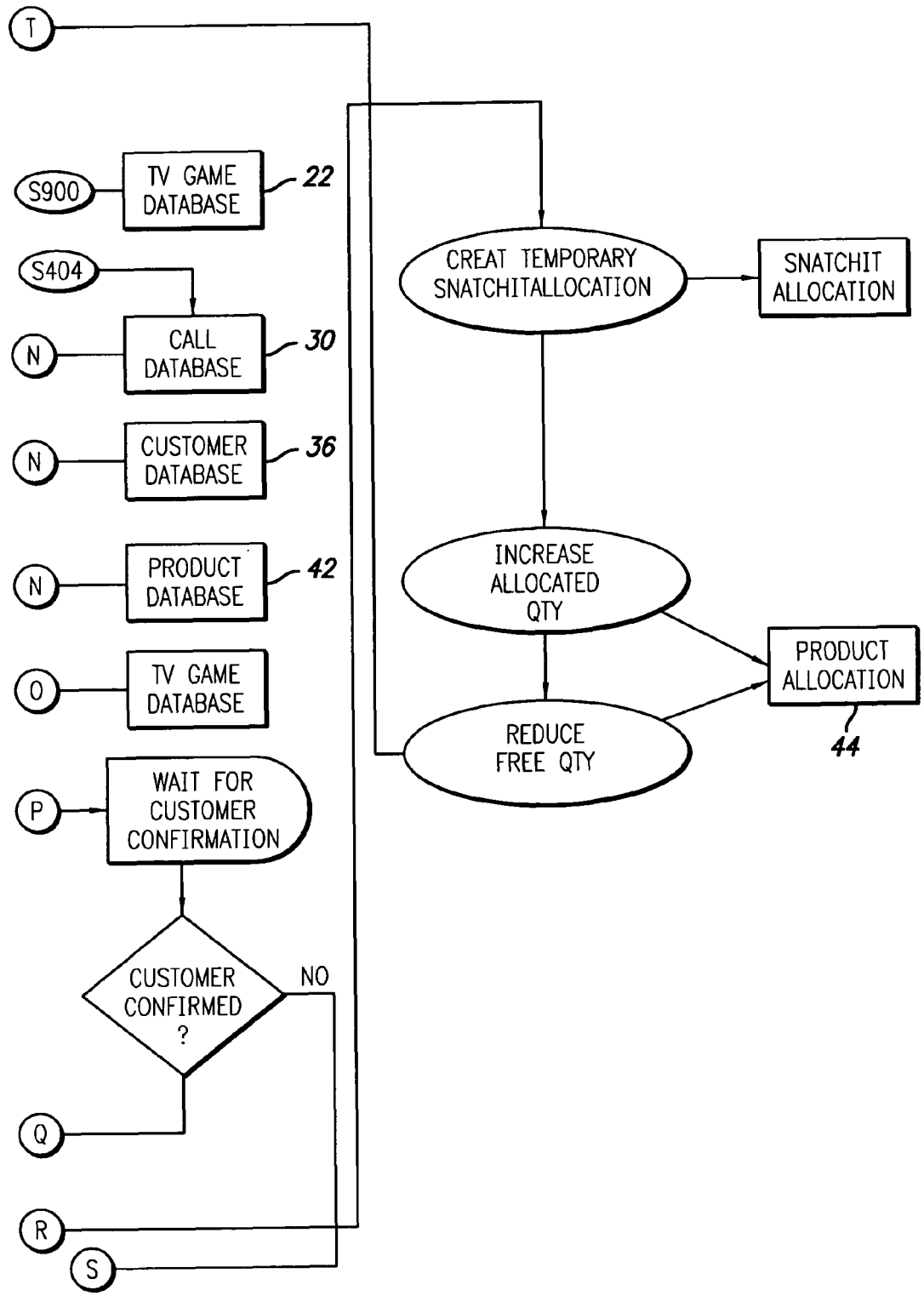

In FIGS. 9-1 to 9-7 is shown the process of the system 12 matching a customer, who is looking to buy a product having already gone through steps S400, S402 and S404 or who has placed a direct call to the call centre unrelated to any game. The process begins at step S900 which is equivalent to step S400. In the situation that a game is not in progress, such as when matching records to help clear undersold units, then the system can skip directly to step S916. Alternatively where the order number is used directly it can go via step S928. In the case of S928 the call centre operative enters an order number and then proceeds to step S930.

After the call is received at step S906 the operator answers the call which is equivalent to step S404. At step S908 the computer system 12 accesses call monitor application 16 to be informed which call record 32 the caller corresponds to. The call record 32 includes the product ID field 118 and the operator is given details of this product which is placed in the product code field 208 of a newly created order record 40. Additionally at step S908 the operative of the call centre 18 may request from the system 12 the caller's customer details, such as by pressing a customer look up button on a PC displaying the new order record 40. System 12 then uses the caller line ID stored in calling number field 106 to attempt to look up customer details. This then uses the telephone look up system 34 to see if there is a customer record 37 in the customer database 36 in the same manner as is done for providing the TV producer 24 with information. The operative does not need to key in the telephone number, this can be done automatically by the computer system 12. This is because the system knows the extension that the operative is working at and at the press of a button can look up the call record 20 corresponding to the caller who is active for that extension.

If a matching customer record 37 is found all of the customer's details and past order history will be made available to the operative and where applicable the relevant fields in the order record 40 are filled. For example the customer name 202, address 204, telephone number 206 can be filled from the matched customer record 202 whilst the product field 208 can be filled from the matched call record 32 and its product ID field 118. If CLID is not available or the customer's present telephone number is not in the telephone look up 34, the operative will try to locate the customer using their post code by requesting it from them. The operative asks the caller for their post code and attempts a customer record look up 37 through the customer database 36 using this. Of course if it is the customer's first purchase a record 27 will not be located.

Even where the CLID did not provide a usable customer record 37 the telephone number field 206 may still be filled from the CLID from the call record 32. When such an order record 40 is stored, the new telephone number field 206 is then used to create an entry/update in the telephone number look up table to match with subsequent calls.

In the case that no customer record can be found the operative asks for all of the details manually and fills them in on the order record 40 simultaneously creating a new customer record 37.

At step S910 the system creates a temporary allocation and in one embodiment can communicate this to the TV producer to take that as a preliminary indicator. This is a stronger indictor than that merely a "1" has been pressed since the caller has now strongly confirmed their intent to proceed to a sale. There is also the possibility that the caller did not press 1 but pressed the wrong number and has gone through and managed to achieve a purchase before the auction finished. In those circumstances this will be indicated to the TV producer 24, so that they can reduce the number of the allocation, if appropriate. The temporary allocation mechanism ensures that the caller successfully secures their unit, regardless of how long the actual order takes to enter onto the computer system 12.

At step S912 after confirmation of sale of the unit, the number of available units in the final product allocation in allocation 44 is then increased at step S914, and the number which are available to sell is reduced.

The customer record 37 is found from the customer database 36 at step S916. Next at step S918 the computer system 12 and/or operator determines whether the record has been correctly found and if not goes to step S920 where a new customer record 37 is created and entered in the customer database 36, the process then proceeding to step S922. If correctly found at step S918, the process proceeds to step S922.

At step S922 the order history of the customer is retrieved from the customer database 36 and additionally previous corresponding orders are found from the order database 38 with the order records 40 which match the customer record 37. The individual caller may then choose to create a new order or may add the new order to an existing order record. In the case that a new order is created the system proceeds to step S934 and if it selects an existing one then it goes to step S926. At step S926 a particular order record is selected and the details of it are obtained at step S930 from the order database 38.

Next at step S932 the system 12 determines whether the order is completed and if it is skips to step S944 and if it is not it goes to step S938.

At step S934 a new order record 40 is created for the customer and placed in the order database 38. At step S936 the system 12 determines whether the order record is locked. If it is locked then the process is aborted whereas otherwise it goes to step S938 where the system checks for a temporary allocation from step S910. If no temporary allocation exists, the system proceeds to step S944. If a temporary allocation is found then at step S940 is removed and at step S942 a new order record is created for the unit previously allocated in database 38.

At step S944 the system recalls the items on an existing order from the database 38. Then at step S946 the customer details for that order are recalled and at step S948 there is a stage to check for fraud so that if suspected at step S950 the order can be cancelled by skipping straight to step S952. Provided there is no fraud the process continues to step S954. The order is now reviewed and ultimately completed.

The process then proceeds either to step S952 to cancel the order, to step S953 to abort changes if it was an existing order and no changes were made, to step S956 to save changes and to record a marketing source, or to step S958 to recalculate the order and store changes. All of the steps S352, S953 and S956 results in the order being involved at step S960.

Before step S958 the system or operator may add a unit or voucher and amend a unit, delete a unit or voucher, change payment details, change delivery address (and in the case of changing country it may change the VAT payable), or change the scheduled shipment date. After step S958 it is possible to return to the review order stage at S954 for any of the changes that have been saved in the order database 38. In the case of steps S952, S954 and S956 after they have finished the process ends.

Before step S956 the system may split the order into shippable and out-of-stock lines or save the order depending on the data and store this in the order database 38.

Figure 10:
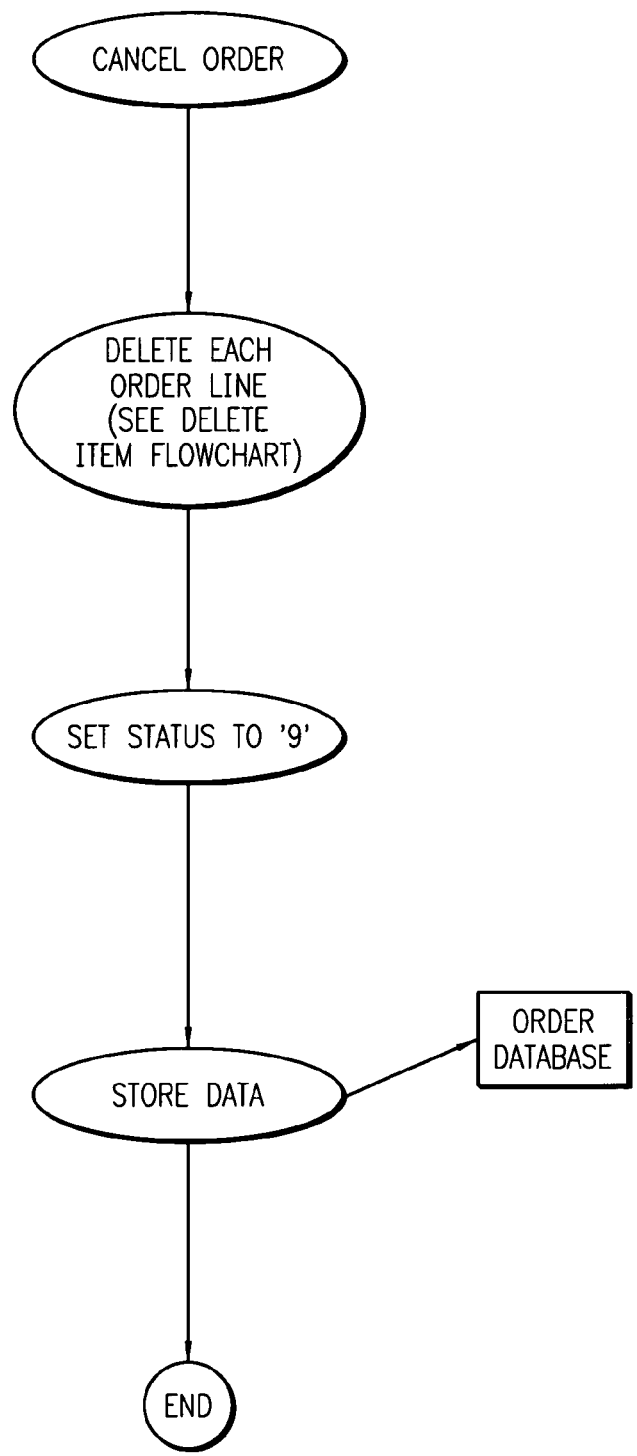
FIG. 10 is a flow chart of the process of cancelling an order.
Figure 11:
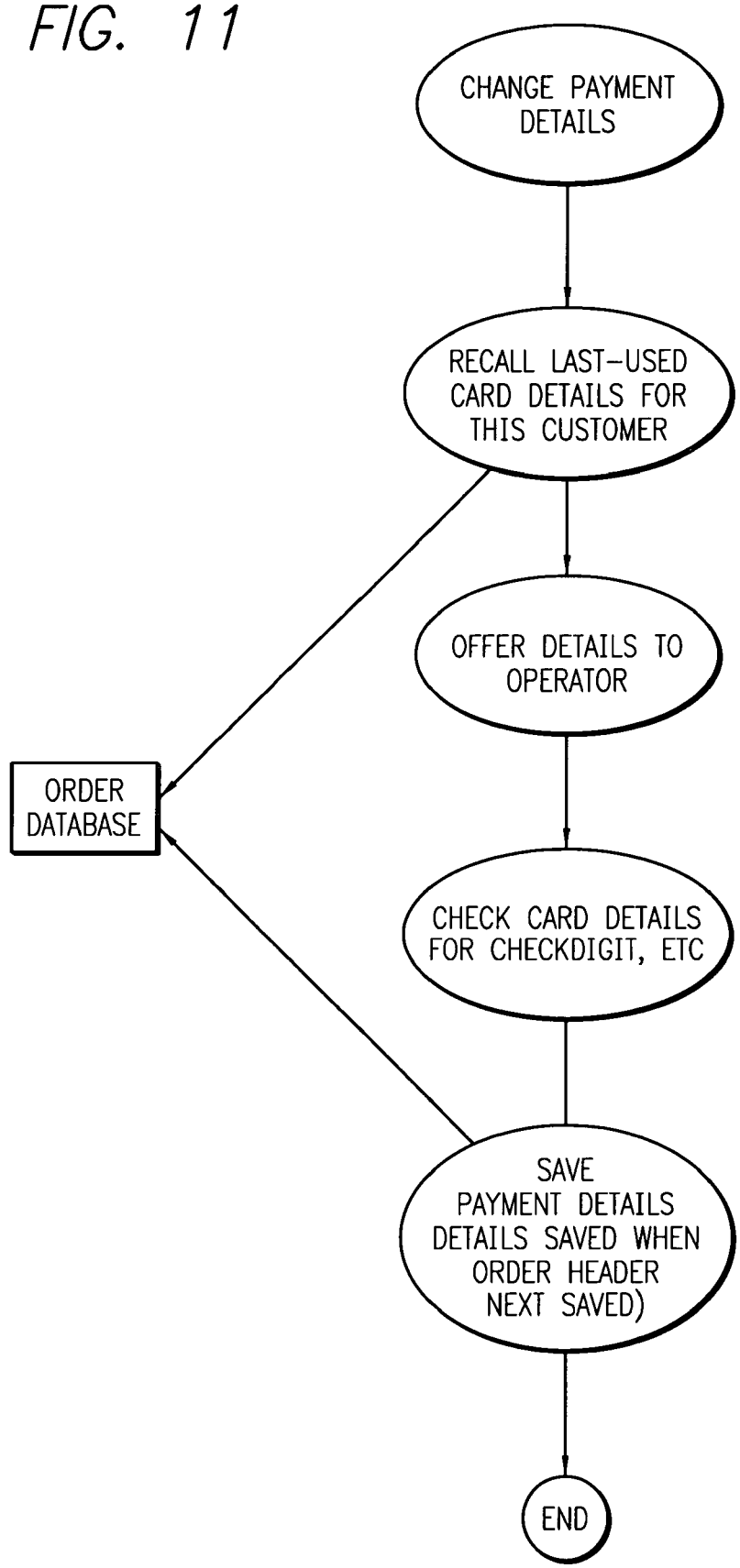
FIG. 11 is a flow chart of the process of changing payment details.

In FIG. 10 is shown a process of cancelling an order and FIG. 11 is showing a process of changing payment details.

Figures 1, 12:
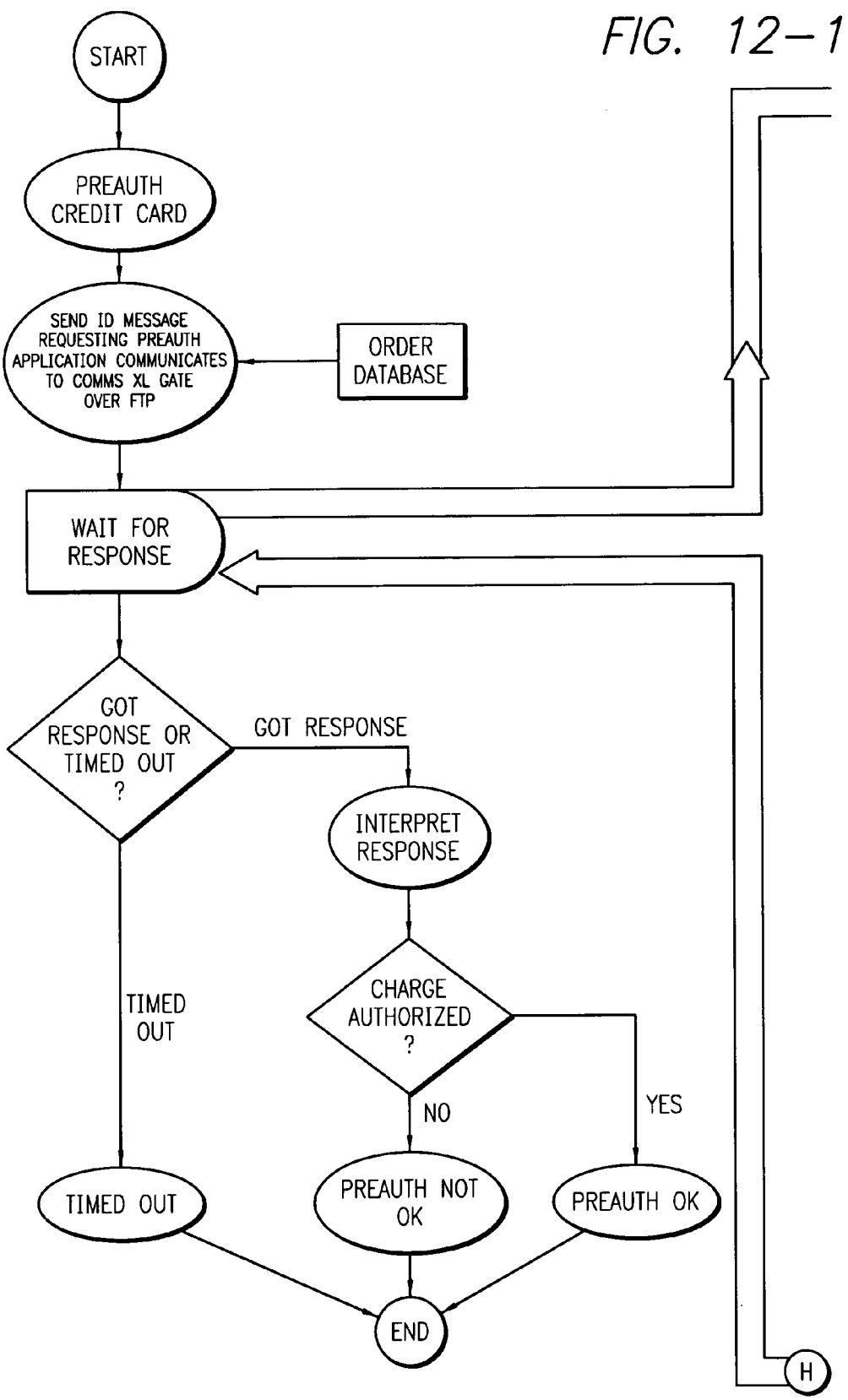
Figures 2, 12:
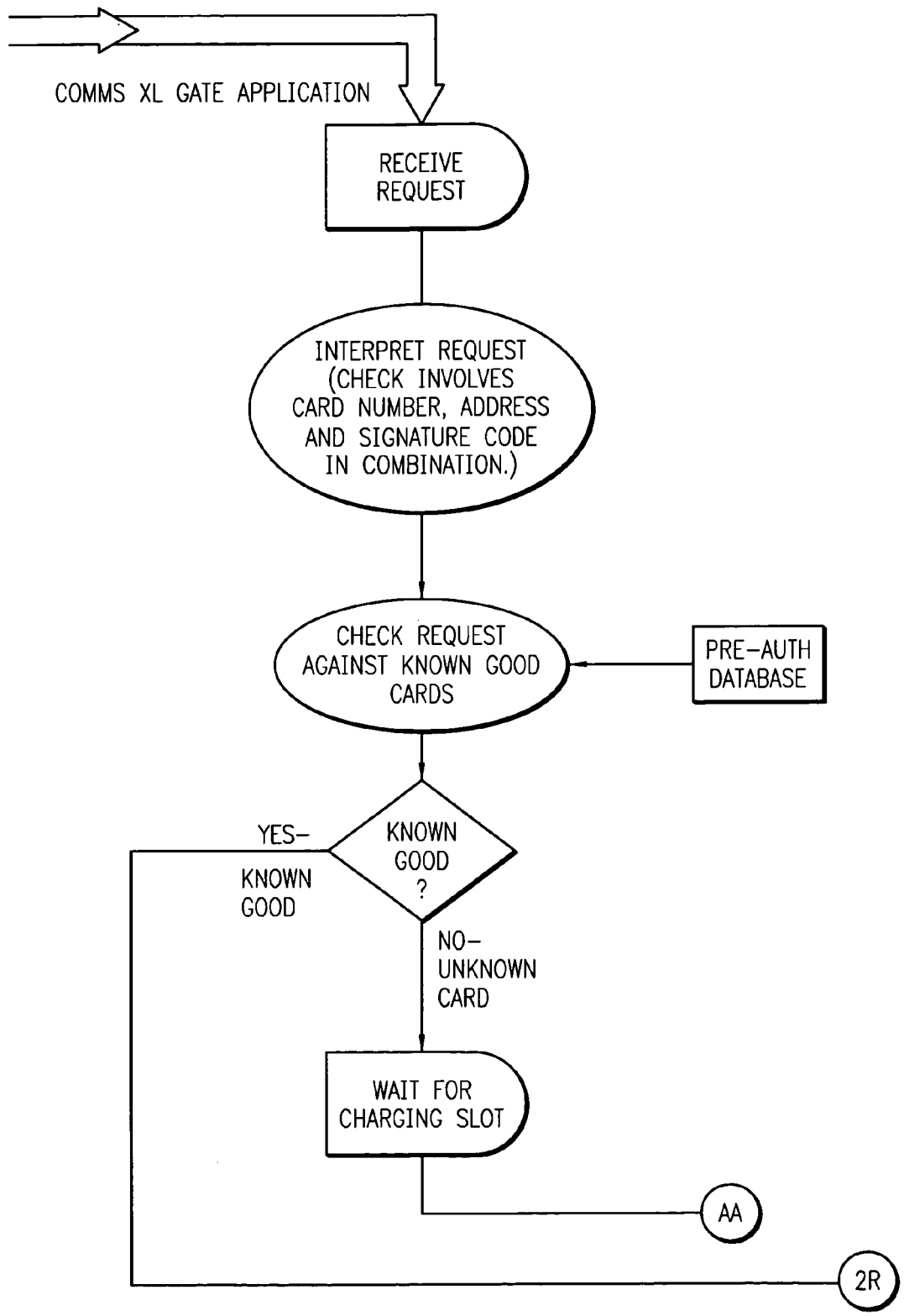
Figures 3, 12:
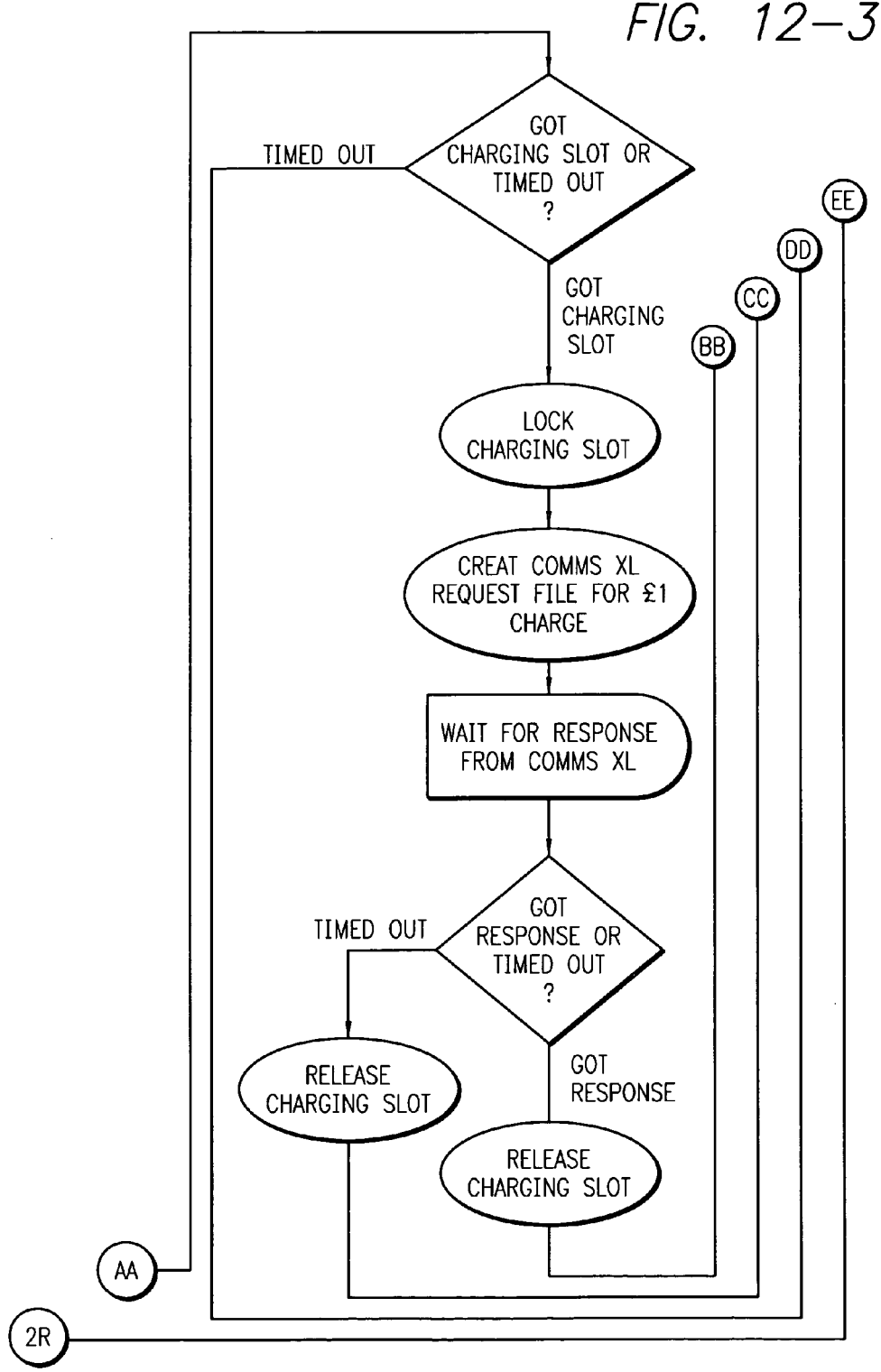
Figures 4, 12:
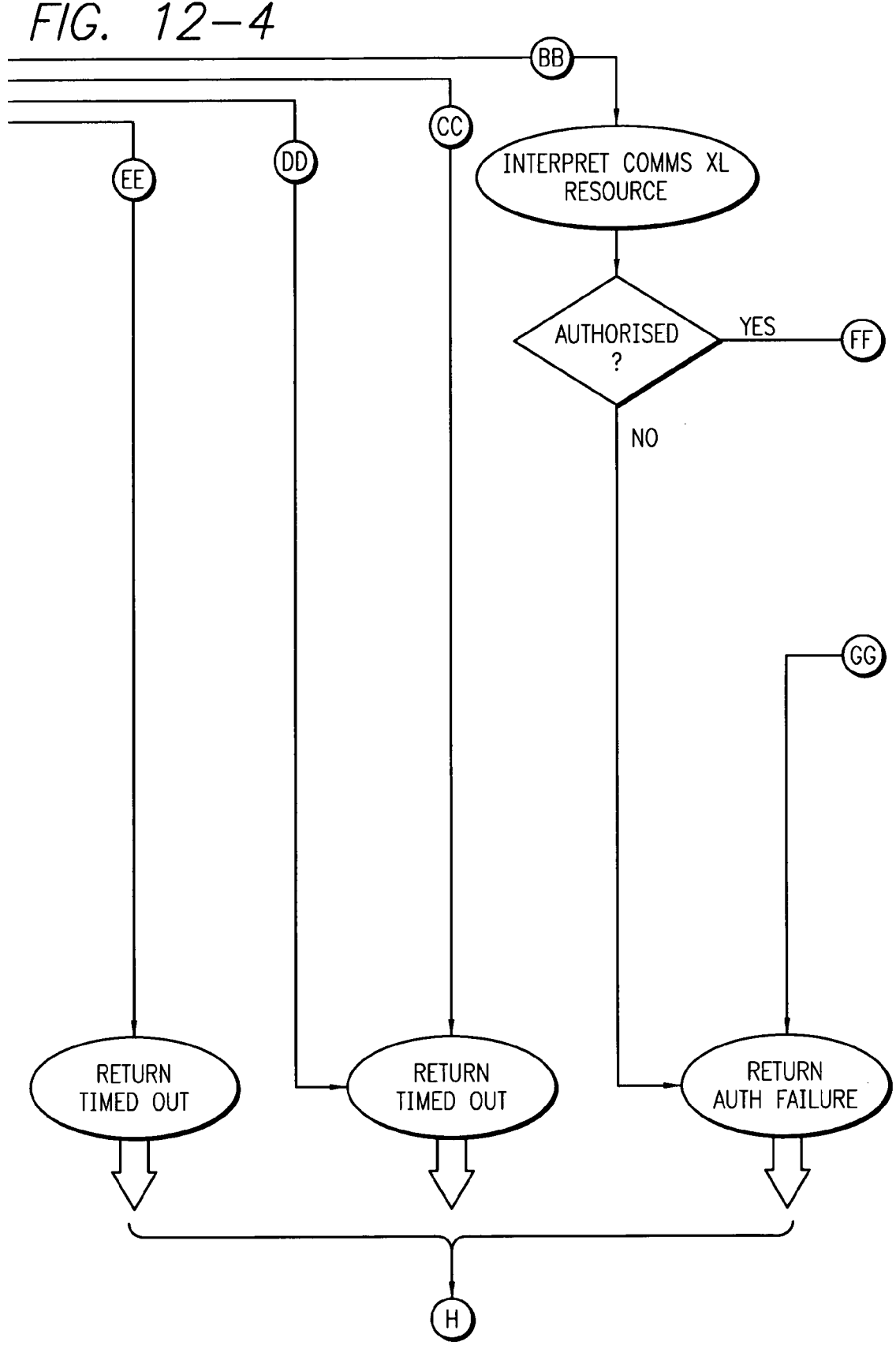
Figures 5, 12:
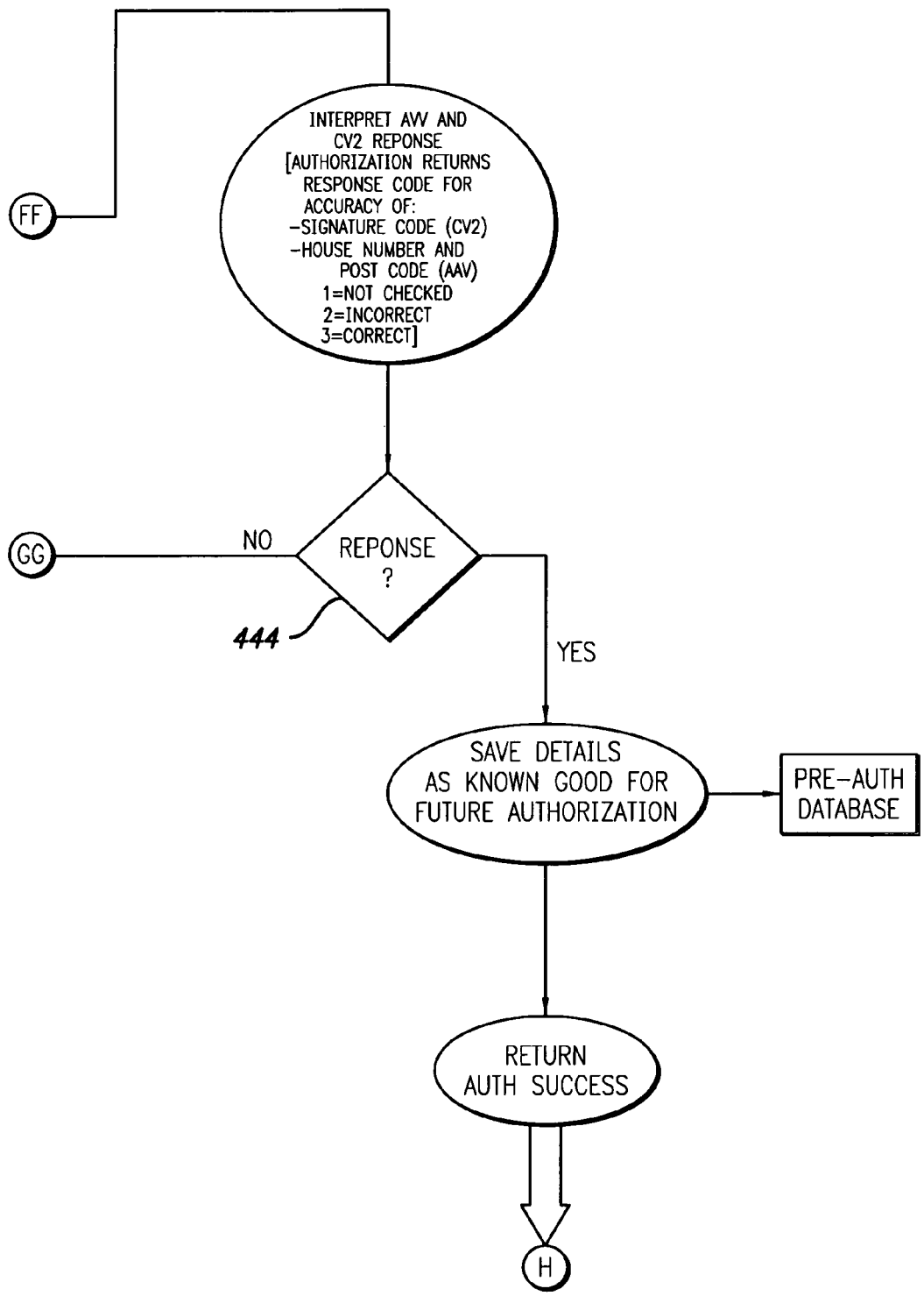

Referring to FIGS. 12-1 to 12-5 there is shown a system of authorising a credit card.

What is claimed is:

1. A method of conducting a telephone based reverse auction for selling units where the reverse auction is transmitted to users on a medium by a system, the method comprising the steps of:

providing a number of units for sale and storing a preliminary available quantity in an allocation database initially indicative of the number provided for sale;

providing a telephone number to which calls from callers can be placed to enter the reverse auction;

recording the time at which one or more calls were received on the telephone number in a call record in a call database;

placing each caller into a queue and assigning them to a call operator or the system in order to sell a unit;

conducting a reverse auction in which the system reduces the indicated price of a unit over time and reduces the preliminary available quantity, wherein the preliminary available quantity is reduced based at least partly on one or more preliminary indicators associated with the caller, and wherein the reducing of the preliminary available quantity occurs before a sale of a unit is completed;

concluding the reverse auction at a time the preliminary available quantity is reduced to a pre-determined number; and storing in an auction database the price at the conclusion of the auction.

2. A method according to claim 1, wherein the order in which calls are put through to the call operator or system is dependent on the stored time on the call record.

3. A method according to claim 1, wherein the price at which a unit is sold is determined from the price at the conclusion stored in the auction database.

4. A method according to claim 1, comprising the step of prompting each caller to enter a piece of data, before entering them into the queue, and storing that data on the call record.

5. A method according to claim 4, wherein whether the call is placed into the queue is dependent on the data entered.

6. A method according to claim 4, wherein one preliminary indicator comprises the data entered and is stored in the call record.

7. A method according to claim 4, wherein one preliminary indicator comprises the time that the data is entered and stored in the call record.

8. A method according to claim 4, wherein the prompting step prompts the user to enter a number on their telephone and where one or more numbers are taken as a preliminary indicator and zero, one or more numbers are taken to not be a preliminary indicator.

9. A method according to claim 1, wherein the number of units provided and a final allocation is also stored in the allocation database, the final allocation is increased whenever a final sale is completed, the system determining whether a sale can be made by determining if the allocation is still below the numbers of units provided.

10. A method according to claim 9, comprising the step of checking that a preliminary indicator corresponding to that call has already resulted in a reduction of the preliminary availability and if not reducing the preliminary available quantity, whenever the final allocation is increased in response to the allocation increase.

11. A method according to claim 1, comprising the step of generating an order record whenever a sale is confirmed, the order record including payment details.

12. A method according to claim 1, where both registered and unregistered callers may take part in the auction.

13. A method according to claim 1, comprising the step of determining the telephone number from which a call has been made and comparing this to a customer database of registered users, where the comparison provides a match allocating the stored customer details to the caller.

14. A method according to claim 13, wherein if there is no match the call operator or system selling the unit to the caller takes details of the caller and enters them along with their telephone number into the customer database for future use.

15. A method according to claim 1, comprising the step of storing events of one of the following preliminary indicators, initial and final price and/or number sold in a game database.

16. A method according to claim 15, wherein events associated with an individual caller are stored in the game database linked to that caller in the call database or the customer database, and wherein previously stored data is recalled when a caller is identified.

17. A method according to claim 16, wherein one preliminary indicator comprises an identified callers stored events in the game database where a caller is found to have high/frequent historical spending patterns.

18. A method according to claim 15, wherein one preliminary indicator comprises a comparison of one or more events in the auction with historical events in the game database.

19. A method according to claim 1, wherein in the event of there being more callers giving preliminary indicators than available units, the callers with the earlier times on their call record are sold the units or the callers who gave appropriate preliminary indicators are sold the units and when there are more callers who gave the appropriate preliminary indicator than there are available units, the callers who gave the appropriate indicator and have the earlier stored time are sold the units.

20. A method according to claim 1, wherein the product that was part of the auction at the time the caller called is also stored in the call database and when put through to the operator or system the unit offered for sale to them is determined from the stored product in the call record.

21. A method according to claim 20, wherein the auction is used to sell a different product and the different product is stored in the call database for a new caller after the preliminary available quantity has dropped to the predetermined number before the completion of all sales or before any increase in the final allocation, and the same telephone number is provided for calls from callers, including the new caller, to be placed to enter the reverse auction for the different product as was provided for the first product.

22. A method according to claim 1, wherein one of the numbers constitutes confirmation of an intent to buy the product in the auction.

23. A method according to claim 22, wherein the preliminary available quantity will not be reduced unless the correct number of the keypad has been pressed by a caller or the caller subsequently went on to place an order.

24. A method according to claim 1, wherein orders can be placed by internet as well as by telephone.

25. A method according to 24, wherein the auction is transmitted over the internet and also by television or another medium.

26. A method according to claim 24, wherein the act of a user notifying intent to buy an auction unit on the internet by placing it in a shopping cart may comprise a preliminary indicator and/or may result in the final allocation being increased.

27. A method according to claim 1, wherein one or more callers who were unsuccessful in the auction are called back after the auction using their determined telephone number to make a further sale or to have details taken.

28. A method according to a claim 27, wherein callers are called back or not called back based on one or more preliminary indicator corresponding to their call during the auction.

29. A method according to claim 27, wherein one or more callers who were unsuccessful in the auction are identified by matching call records to order records and removing those that match, from a list to be called back.

30. A method according to claim 29, wherein the order records are matched to call records by generating a unique number for each call and storing this in both records.

31. A method according to claim 29, wherein the order records are matched to call records by matching the order record to data in the customer database and using the stored telephone number in the customer database corresponding to that data to match the data with a call record in which that telephone number was recorded, and then tagging that call record to the order record.

32. A method according to claim 29, comprising the steps the system requesting a reduction in the preliminary available quantity and determining whether the request reduction can be made by comparing the requested reduction with a maximum possible sold quantity and not allowing a reduction in number which would reduce the available preliminary quantity to a number below the starting value less the maximum possible sold quantity.

33. A method according to claim 32, wherein the reduction requested would reduce the preliminary quantity to below the maximum possible sold quantity, the quantity is instead reduced to the starting value less the maximum possible sold quantity.

34. A method according to claim 32, wherein the maximum value is calculated by adding together the total number of calls received with any website orders and/or any additional units bought by a caller who has gone through the sales process.

35. A computer system for conducting a reverse auction of units, the system comprising:
   a processor;
   a memory connected to the processor including an allocation database, wherein the allocation database contains a preliminary available quantity indicative of the number of units provided in an auction;
   an auction database;
   a call database;
   a telephony system, wherein the telephony system is configured to record the time at which a call is received and a number which was dialed in a call record in the call database, and configured to place each caller into a queue assigning them to a call operator or system in order to sell a unit; and
   a display;
      wherein the processor is configured to display a price on the display and to reduce the displayed price over time and to reduce the preliminary available quantity, to determine when the preliminary available quantity is reduced to a pre-determined number, to store the displayed price at that time in the auction database, and to prevent new telephone calls to the telephony system being entered into the auction; and
      wherein the system reduces the preliminary available quantity based at least partly on one or more preliminary indicators associated with, the caller, wherein the reducing of the preliminary available quantity occurs before a sale of the unit is completed.

36. A method of selling units on television by a system conducting a reverse auction comprising the steps of:
   displaying a unit for sale on television along with an initial price and the number of the units available for sale in the reverse auction;
   allowing telephone calls to be made to the system for callers to take part in the reverse auction;
   determining by the system a caller has given sufficient indications based on one or more preliminary indicators that a sale is likely to occur;
   reducing the displayed available quantity based at least partly on the one or more preliminary indicators associated with the caller, and wherein the reducing of the preliminary available quantity occurs before a sale of a unit is completed;
   reducing the displayed price for the unit to encourage more callers to reduce the television time taken up by the auction; and
   concluding the auction when the displayed available quantity reaches zero.

37. A method according to claim 36, wherein the price is frozen once the displayed available quantity has reached zero and all the units in the auction are sold at the frozen price.

38. A method according to claim 37, comprising the step providing information concerning the auction on a website substantially simultaneously as on television and allow entries into the auction to be made from the internet.

39. A method of conducting an internet based reverse auction for selling units where the reverse auction is transmitted to users on a medium, the method comprising the steps of:
   providing a number of units for sale and storing a preliminary available quantity in an allocation database initially indicative of the number provided for sale,
   providing a website purchasing facility to which orders from users can be placed to enter the reverse auction,
   recording the time at which one or more calls were received by callers on a telephone number in a call record in a call database,
   placing each caller into a queue and assigning them to a call operator or system in order to sell a unit,
   conducting a reverse auction in which the system reduces the indicated price of a unit over time and reduces the preliminary available quantity, wherein the preliminary available quantity is reduced based at least partly on one or more preliminary indicators associated with the caller, wherein the reducing of the preliminary available quantity occurs before a sale of a unit is completed,
   concluding the reverse auction at a time the preliminary available quantity is reduced to a pre-determined number, and
   storing in an auction database the price at the conclusion of the auction.

* * * * *